US011526484B2

(12) United States Patent
Olivier et al.

(10) Patent No.: US 11,526,484 B2
(45) Date of Patent: Dec. 13, 2022

(54) METHODS AND SYSTEMS FOR CREATING AND MANAGING MICRO CONTENT FROM AN ELECTRONIC DOCUMENT

(71) Applicant: MadCap Software, Inc., San Diego, CA (US)

(72) Inventors: Anthony Olivier, Carlbad, CA (US); Vincent Denosta, San Diego, CA (US); Francis Novak, San Diego, CA (US); Richard Martin, San Diego, CA (US)

(73) Assignee: MADCAP SOFTWARE, INC., San Diego, CA (US)

(*) Notice: Subject to any disclaimer, the term of this patent is extended or adjusted under 35 U.S.C. 154(b) by 134 days.

(21) Appl. No.: 16/507,754

(22) Filed: Jul. 10, 2019

(65) Prior Publication Data

US 2021/0011899 A1    Jan. 14, 2021

(51) Int. Cl.
| | | |
|---|---|---|
| *G06F 16/22* | (2019.01) | |
| *G06F 3/04842* | (2022.01) | |
| *G06F 40/14* | (2020.01) | |
| *G06F 40/106* | (2020.01) | |
| *G06F 40/134* | (2020.01) | |
| *G06F 40/166* | (2020.01) | |
| *G06F 16/23* | (2019.01) | |
| *G06F 16/25* | (2019.01) | |
| *G06F 40/117* | (2020.01) | |

(52) U.S. Cl.
CPC ...... *G06F 16/2291* (2019.01); *G06F 3/04842* (2013.01); *G06F 16/2379* (2019.01); *G06F 16/252* (2019.01); *G06F 40/106* (2020.01); *G06F 40/117* (2020.01); *G06F 40/134* (2020.01); *G06F 40/14* (2020.01); *G06F 40/166* (2020.01); *G06F 2203/04803* (2013.01)

(58) Field of Classification Search
CPC .... G06F 40/134; G06F 40/117; G06F 40/166; G06F 40/106; G06F 40/14; G06F 16/2291; G06F 16/2379; G06F 16/252; G06F 3/04842
See application file for complete search history.

(56) References Cited

U.S. PATENT DOCUMENTS

| | | | |
|---|---|---|---|
| 8,869,066 B2 | 10/2014 | Vonarburg et al. | |
| 8,954,379 B2 | 2/2015 | Carter et al. | |
| 10,599,753 B1* | 3/2020 | Eisner | G06F 40/197 |
| 2004/0205542 A1* | 10/2004 | Bargeron | G06F 40/169 |
| | | | 715/201 |
| 2004/0216032 A1* | 10/2004 | Amitay | G06F 40/169 |
| | | | 715/230 |

(Continued)

*Primary Examiner* — Thu V Huynh
(74) *Attorney, Agent, or Firm* — Procopio, Cory, Hargreaves & Savitch LLP

(57) ABSTRACT

Systems and methods are disclosed herein for processing one or more document and/or hierarchal project. For example, a system is disclosed having memory storing the document as a data file comprising content data. The system also includes at least one processor coupled to the at least one memory and configured to designate a portion of the content data as micro content; receive user input providing a phrase; and generate a phrase map configured to associate the phrase with the designated micro content and store the phrase map as phrase map data, the phrase map data comprising at least the phrase associated with a reference indicative of the associated micro content.

30 Claims, 19 Drawing Sheets

(56) References Cited

U.S. PATENT DOCUMENTS

| | | | |
|---|---|---|---|
| 2007/0208994 A1* | 9/2007 | Reddel | G06F 40/197 715/205 |
| 2008/0222512 A1* | 9/2008 | Albornoz | G06F 16/93 715/230 |
| 2010/0241947 A1* | 9/2010 | Dahn | G06F 16/332 715/233 |
| 2010/0318893 A1* | 12/2010 | Matthews | G06F 40/169 715/230 |
| 2011/0131482 A1 | 6/2011 | Shteinvil et al. | |
| 2012/0060082 A1* | 3/2012 | Edala | G06F 16/36 715/231 |
| 2013/0246901 A1* | 9/2013 | Massand | G06Q 10/10 715/229 |
| 2014/0115436 A1* | 4/2014 | Beaver | G06F 40/169 715/229 |
| 2014/0164901 A1* | 6/2014 | McDowell | G06F 16/48 715/233 |
| 2015/0057994 A1 | 2/2015 | Fang et al. | |
| 2015/0186349 A1* | 7/2015 | Hicks | G06F 3/013 715/230 |
| 2015/0278169 A1* | 10/2015 | Vanderport | G06F 3/04842 715/208 |
| 2015/0339270 A1* | 11/2015 | Morton | G06F 40/106 715/203 |
| 2016/0275086 A1 | 9/2016 | Gaddis et al. | |
| 2017/0200141 A1 | 7/2017 | Pattajoshi | |
| 2018/0165262 A1* | 6/2018 | Biswas | G06F 40/169 |

\* cited by examiner

```
NewMicroContent.flmco - Notepad
File  Edit  Format  View  Help
<?xml version="1.0" encoding="utf-8"?>
<MicroContentSet Comment="Default micro content set.">
  <MicroContent>
    <MicroContentPhrase>Phrase 3</MicroContentPhrase>
    <MicroContentResponse href="../../D_imagePositionedLeft.htm!microcontent1" />
  </MicroContent>
  <MicroContent>
    <MicroContentPhrase>Phrase 1</MicroContentPhrase>
    <MicroContentResponse>
      <xhtml:html xmlns:MadCap="http://www.madcapsoftware.com/Schemas/MadCap.xsd" xmlns:xhtml="http://www.w3.org/1999/xhtml">
        <xhtml:body>
          <xhtml:h1>Basic Steps</xhtml:h1>
          <xhtml:p>Here are the basic steps for using <MadCap:variable xhtml:name="General.ProductName" /></xhtml:p>
          <xhtml:ol>
            <xhtml:li>Here is some general text for a set of steps. Replace this with your own content.</xhtml:li>
            <xhtml:li>Here is some general text for a list items. Replace this with your own content.</xhtml:li>
            <xhtml:li>Here is some general text for a set of steps. Replace this with your own content.</xhtml:li>
            <xhtml:li>Here is some general text for a set of steps. Replace this with your own content.</xhtml:li>
            <xhtml:li>Here is some general text for a list item. Replace this with your own content.</xhtml:li>
          </xhtml:ol>
        </xhtml:body>
      </xhtml:html>
    </MicroContentResponse>
  </MicroContent>
  <MicroContent>
    <MicroContentPhrase>Phrase 2</MicroContentPhrase>
    <MicroContentPhrase>Alternate Phrase 1</MicroContentPhrase>
    <MicroContentPhrase>Alternate Phrase 2</MicroContentPhrase>
    <MicroContentResponse href="../../A_Getting Started/Getting Started.htm" />
  </MicroContent>
</MicroContentSet>
```

FIG. 9A

```
Getting Started.htm - Notepad
File  Edit  Format  View  Help
<?xml version="1.0" encoding="utf-8"?>
<html xmlns:MadCap="http://www.madcapsoftware.com/Schemas/Madcap.xsd">
    <head>
        <link href="" rel="stylesheet" type="text/css" />
    </head>
    <body>
        <h1>Getting Started</h1>
        <p>See the following to get started quickly.</p>
        <ul>
            <li><span class="SetOffFirstLevel">Do This </span>Here is some general text for a list item. Replace this with your own content.</li>
            <li><span class="SetOffFirstLevel">Do That </span>Here is some general text for a list item. Replace this with your own content.</li>
            :li><span class="SetOffFirstLevel">Do The Other Thing </span>Here is some general text for a list item. Replace this with your own content.
            Here is some general text for a list item. Replace this with your own content.</li>
        </ul>
    </body>
</html>
```

```
<?xml vesion="1.0" encoding="utf-8"?>
<html xmlns:MadCap="http://www.madcapsoftware.com/Schemas/MadCap.xsd">
    <head>
        <link href="" rel="stylesheet" type="text/css" />
    </head>
    <body>
        <h1>Example Phrase 1x/h1>
        <p>Here is some general text </p>
        <MadCap:microContent id="microcontent1">
            <ul>
                <li>List item 1</li>
                <li>List item 2</li>
                <li>
                    <p>List item 3</p>
                    <p>
                        <img src="../Resources/Images/Image.png" alt="" />
                    </p>
                </li>
            </ul>
        </MadCap:microContent>
    </body>
</html>
```

FIG. 9C

```
phrase-3.htm
File  Edit  Format  View  Help
<!DOCTYPE html>
<html xmlns:MadCap="http://www.madcapsoftware.com/Schemas/Madcap.xsd" lang="en-us" xml:lang="en-us" data-mc-search-type="stem"
data-mc-help-system-file-name="Default.xml" data-mc-path-help-system=",,"
data-mc-target-type="WebHelp2" data-mc-runtime-file-type="Topic" data-mc-preload-images="false" data-mc-preview-mode="false" data-mc-toc-path="" ,
<head>
    <meta name="viewport" content="width=device-width, initial-scale=1.0" />
    <meta charset="utf-8" />
    <meta http-equiv="X-UA-Compatible" content="IE=edge" />
    <meta http-equiv="Content-Type" content="text/html; charset=utf-8" />
    <link href="../Content/Resources/Stylesheets/MainStyles.css" rel="stylesheet" type="text/css" /><title>Phrase 3</title>
    <meta name="phrase" value="Phrase 3" />
    <meta name="feedback" value="true" />
    <meta name="source-type" value="micro-content" />
    <meta name="truncated" value="false" />
    <meta name="linkto" value="../Content/D Images/ImagePositionedLeft.htm#microcontent1" />
</head>
<body>
    <ul>
        <li value="1">List item 1</li>
        <li value="2">List item 2</li>
        <li value="3">
            <p>List item 3</p>
            <p>
                <img src="../Content/Resources/Images/image.png" alt="" />
            </p>
        </li>
    </ul>
</body>
</html>
```

FIG. 10

How to apply a condition tag

1. For most elements, you can right-click and select Conditions (or Properties > Conditional Text for files)
2. Select the condition tag set and choose the condition(s) you want to apply
3. Click OK
4. Click 💾 to save your work More Details...

More Information

Here is the first paragraph
Here is the second paragraph
Here is the third paragraph
Here is the fourth paragraph
Here is the fifth paragraph
Here is the sixth paragraph This text for online only

| | text | |
|---|---|---|
| ✂ | Cut | Ctrl |
| 📋 | Copy | Ctrl |
| 📋 | Paste | Ctrl |
| | Insert | |
| | Create Auto Suggestion | |
| | Thesaurus | Shift |
| ✏ | Conditions... | Ctrl+Shift |
| | Save Chan | |

Applying Conditions to Content
Learn now to apply condition tags to different content elements. This lets you single-source the content that you create in multiple target outputs.
_Conditions/Applying-Condition-Tags-to-Content.htm

Applying Conditions for Print-based Output
Apply condition tags to mark what shows up in print-based manuals and what doesn't. Learn about other ways to use condition tags in MadCap Flare.
_Output/Printed-Output/Applying-Condition-Tags-Printed-Output.htm

Applying Conditions to Browse Sequences
Learn now to apply condition tags to different content elements. This lets you single-source the content that you create in multiple target outputs.
_Browse-Sequences/More/Applying-Condition-Tags-to-Browse-Sequence.htm Your search for "apply condition" returned 194 result(s).

FIG. 11

METHODS AND SYSTEMS FOR CREATING AND MANAGING MICRO CONTENT FROM AN ELECTRONIC DOCUMENT

TECHNICAL FIELD

The present invention relates generally to representing and manipulating underlying content of a document, and more specifically, to providing an integrated editor that allows for creating and managing associations between designated content from the document with phrases that allow for ease of locating and referencing the designated content.

BACKGROUND

Documents may generally be categorized as being either structured or unstructured. Unstructured documents represent content as a linear sequence of characters. These characters include the content as well as control characters that specify formatting information regarding the content. A structured project, in contrast, is not ordered as a linear representation but typically is organized as a tree structure or other type of directed acyclic graph. For example, a document may be represented as a tree with a node at the top having child nodes representing content groupings and the front and back portions of the content, which may include sections and paragraphs. These components are organized as a hierarchical tree. Each structured document may be specified in a structured document language, such as the extensible markup language (XML), the Standard Generalized Mark-up Language (SGML), hypertext markup language (HTM or HTML), Extensible HyperText Markup Language (XHTML), or any markup language known in the art, or may be specified according to a known standard, such as the Office Document Architecture (ODA) standard.

For users, the editing of unstructured projects is fairly intuitive and straightforward. The user simply selects a portion of the project to be edited and then applies an editing operation to the selected portion. With structured documents, editing is not as straightforward. Structured document editors require that the user operate on the syntactic entities (e.g., section, paragraph, etc.) specified within the structured project. As a result, editing operations may be cumbersome. Accordingly, it may not be possible to edit a portion of the document, which spans the boundaries of syntactic entities, in a single operation.

Current editors for writing with markup languages, such as XHTML, HTML, XML and SGML, focus primarily on either structure (at the expense of content editing) or focus on content editing (and abstract away the underlying structure).

The present disclosure is directed toward overcoming one or more of the problems discovered by the inventors.

SUMMARY

Accordingly, systems and methods are disclosed for processing a document and/or hierarchal project. In one aspect, a system is disclosed that comprises at least one memory storing the document as a data file comprising content data and storing instructions for processing the document. The system also comprises at least one processor coupled to the at least one memory and configured to execute the instructions to designate at least a portion of the content data as micro content; receive user input providing a phrase; and generate a phrase map configured to associate the phrase with the designated micro content and store the phrase map as phrase map data file in the at least one memory, the phrase map data comprising at least the phrase associated with a reference indicative of the associated micro content.

In another aspect, a method is disclosed for processing a document. The disclosed method comprises storing the document as a data file comprising content data; designating at least a portion of the content data as micro content; receiving user input providing a phrase; and generating a phrase map configured to associate the phrase with the designated micro content and storing the phrase map as phrase map data in at least one memory, the phrase map data comprising at least the phrase associated with a reference indicative of the associated micro content.

In another aspect, an apparatus is disclosed for processing a document. The disclosed apparatus comprises a means for storing the document as a data file comprising content data; a means for designating at least a portion of the content data as micro content; a means for receiving user input providing a phrase; and a means for generating a phrase map configured to associate the phrase with the designated micro content and storing the phrase map as phrase map data in the storing means, the phrase map data comprising at least the phrase associated with a reference indicative of the associated micro content.

BRIEF DESCRIPTION OF THE FIGURES

The details of embodiments of the present disclosure, both as to their structure and operation, may be gleaned in part by study of the accompanying drawings, in which like reference numerals refer to like parts, and in which:

FIG. 9A-9C illustrate example data files generated by the data processing system shown in FIG. 2B.

FIG. 10 illustrates another example data file included in an example published output file of the hierarchical project shown in FIG. 2A.

FIGS. 11-15 illustrate example uses of micro content included as part of a published output file of the hierarchical project shown in FIG. 2A.

DETAILED DESCRIPTION

The detailed description set forth below, in connection with the accompanying drawings, is intended as a description of various embodiments and is not intended to represent the only embodiments in which the disclosure may be practiced. The detailed description includes specific details for the purpose of providing a thorough understanding of the embodiments. However, it will be apparent that those skilled in the art will be able to understand the disclosure without these specific details. In some instances, well-known structures and components are shown in simplified form for brevity of description. Some of the surfaces have been left out or exaggerated for clarity and ease of explanation.

Embodiments herein provide electronic authoring and publishing systems and methods for designating portions of a document as micro content and associating each designated portion with a phrase. The electronic authoring and publishing systems may be any system for authoring documents, for example, word processing packages, online authoring packages, etc. The document may be a single electronic document, for example, an XHTML document, documents generated authoring tools or software packages (e.g., by word processing software packages, online authoring packages, etc.) or any electronic document. In various embodiments, the document may be included as part of an overall project that may arrange the contents thereof (e.g., content and control data) in a hierarchical arrangement (e.g., referred to herein as a "hierarchical project"). As used herein, "micro content" may refer to any designated portion of an electronic document and/or a portion of a hierarchical project, for example, micro content may be short, concise excerpts of content of the project or a document included therein. The micro content may stand alone, maximize, and expand the re-use of designed content beyond structured authoring, for example, by providing relevant and search results usable in various search and machine learning applications. Embodiments herein may provide for a graphical user interface (GUI) through which one or more documents making up the hierarchical project may be accessed and, in one or more editors, portions (e.g., text, images, multimedia, other non-text elements, etc.) of the accessed document can be designated as micro content. The GUI may also provide for creating phrases and associating a phrase with each portion designated as micro content. As used herein, "phrases" may refer to any string of alphanumeric or non-alphanumeric (e.g., $, %, !, etc.) characters desired by the author. For example, phrases may be plain language terms having known meaning, a sentence or portion of a sentence, or any collection of alphanumeric or non-alphanumeric characters.

Figure 1:
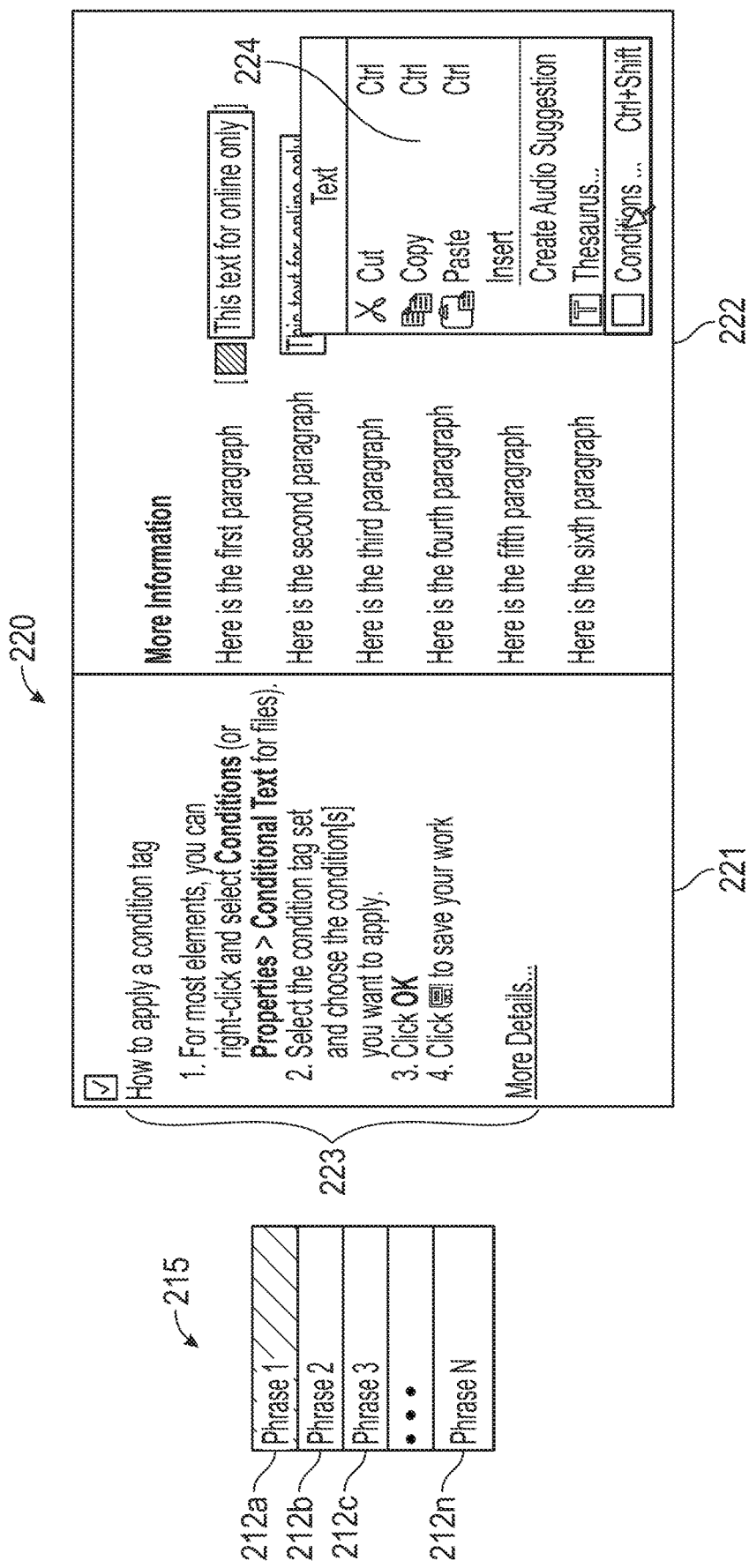
FIG. 1 is a graphical representation of an example phrase map and micro content included in a hierarchical project.

For example, FIG. 1 illustrates an example graphical representation of a phrase map 215 and a micro content 220 included in a structured project. The phrase map 215 may include a plurality of phrases 212a-n and the micro content 220 corresponds to a phrase included in the phrase map 215. For example, micro content 220 may be associated with the selected (e.g., highlighted) phrase 212a, and may include any content as designated for association with the phrase 212a. For example, micro content may include one or more of text, images, multimedia, etc. and may comprise any desired formatting or structure, such as but not limited to, columns, bullet points, various fonts and sizes, colors, etc. In the illustrated example, the micro content 220 includes a first column 221 and a second column 222, with the first column 221 displaying textual content 223 and the second column 222 displaying an image 224 and text. However, micro content 220 need not include the columns as illustrated, as one skilled in the art will appreciated that micro content 220 may be any content desired and designated for association with the phrase 212a. In some embodiments, the micro content 220 (and other micro content) may be stored in association with phrase 212a at a common location (for example in a common data file). While, in other non-mutually exclusive embodiments, a reference (e.g., link and/or directory pathway pointer) to the micro content 220 may be stored in association with phrase 212a at a common location. In some embodiments, micro content 220 may be associated with one or more phrases including in the phrase map 215. Thus, variations on similar phrases may be associated with common micro content.

Some of the embodiments herein also provide for publishing a hierarchical project to enable graphically displaying and interaction by external devices, for example, as a webpage displayed in an internet browser on a computer, mobile device, tablet, etc. Publishing the hierarchical project includes, for example, compiling document data files (e.g., documents) of the hierarchical project to generate a published output file comprising a plurality of data files provided in executable code format and other data structures for graphically displaying formatted content of the hierarchical project. In various embodiments, the published project can be graphically displayed as a webpage by an internet browser executing the various data files of the published output file. When the hierarchical project is published, the micro content designations and the associated phrases may be included in the published output file. The designations and the associated phrases need not be displayed in the published project (e.g., not displayed on the web page), but provide ease of searching for content based on ingesting a phrase to locate and display the associated micro content. In some embodiments, a search engine can be configured to search the published output file, match search requests against phrases, and display a response based on micro content associated with the phrase. In various embodiments, micro content may be tagged using unique XML extensions based on the associated phrase, thereby facilitating identification of designated content which is ingestible by machine ready and artificial intelligence applications without requiring graphically displaying the published structure project. Example applications include, but are not limited to, chatbots, augmented or virtual reality, frequently asked question (FAQ) database, field level help applications, electronic or web forms, etc.

Figure 2A:
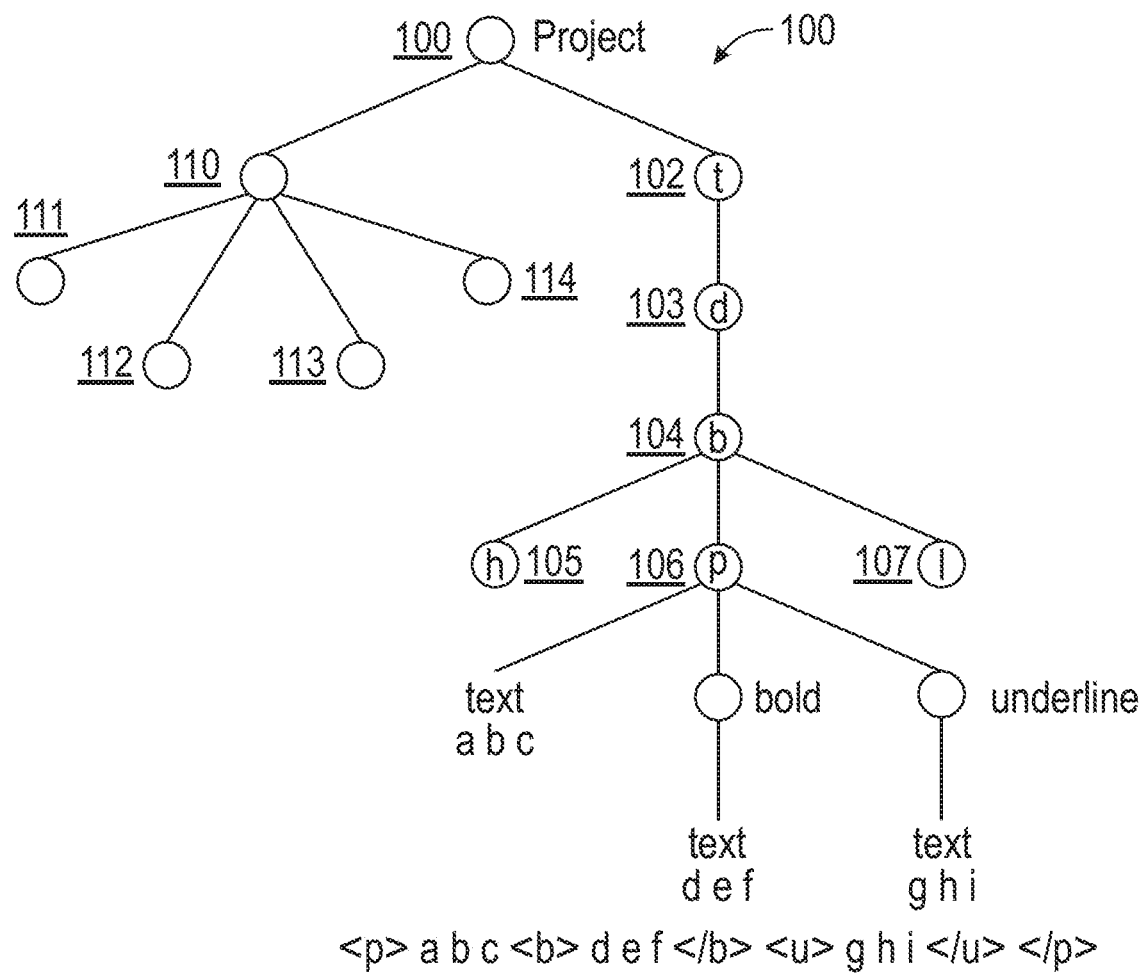
FIG. 2A is a graphical representation of a relatively simple hierarchical project represented in a tree format according to one embodiment.

FIG. 2A is a graphical representation of a relatively simple hierarchical project 100 represented in a tree format. In the illustrated example, the hierarchical project 100 comprises project data that is a compilation of a plurality data files provided in executable code format (e.g., XHTML documents), which may be compiled to generate a single published output file (e.g., a PDF, webpage, or the like) for viewing by others. The project data of the hierarchical project 100 comprises one or more content documents that define the content of the hierarchical project 100, such as for example, documents in XHTML containing the underlying text and content of the hierarchical project (referred to herein as content data files). The hierarchical project 100 may also include control information specifying formatting and other information that applies to the hierarchical project generally, such as for example, documents in XHTML containing styles, structures, formats, conditions, micro content designations, and phrase associations that are applicable to the content documents (referred to herein as control data files). In some embodiments, the hierarchical project 100 may be referred to as an unstructured project comprising a plurality of structured documents.

Hierarchical project 100 may be structured and otherwise organized into topics, with each topic comprising one or more documents related to the topic. In the illustrated example, the relatively simple hierarchical project 100 includes one topic 102, represented by 't', having one or more documents that each include content related to the topic 102. In the relatively simply hierarchical project, the topic 102 includes one document 103 that may be a content data file, which may be provided in executable code format. However, the topic 102 may comprise any number of documents as desired. The document 103 includes a body 104, represented by 'b', having a heading 105 represented by 'h', a paragraph 106 represented by 'p', and/or executable reference 107 to images and/or multimedia content represented by T. Images and multimedia content may be stored separate from the document 103 and retrieved by reference within the document 103, for example, executed in executable code format. In the illustrated example, the paragraph 106 includes plain text 'abc' followed by bold text 'def' followed by underlined text 'ghi'. The tree may be traversed in the order from top to bottom and left to right to translate the various contend data files to be displayed. Therefore, hierarchical project 100 includes document 103 that would be displayed as 'abcdefghi' with any referenced image or multimedia items displayed adjacent to the text.

The hierarchical project 100 may also control information 110 containing instructions generating a published output file including formatting parameters for the hierarchical project 100 for a given display environment (e.g., printing to a PDF, web page publication for viewing via a network on a monitor of a personal computer or display of a mobile device such as a tablet or cellular telephone, etc.). Control information 110 may be a plurality of control data files, which may be provided in executable code format. In the illustrated example, the control information 110 may include, among other items, formatting criteria 111, images and/or multimedia documents 112 (e.g., image files in any image format, such as but not limited to, JPEG, PNG, TIFF, GIF, etc.; video files formatted in any video format, such as but not limited to, MP4, 3GP, WMV, AVI, MPEG, etc.; audio files formatted in any image format, such as but not limited to, MP3, ACC, WMA, etc.), landing pages 113 (e.g., small content related documents that may be commonly implemented by document 103 or other documents in the hierarchical project 100), micro content information 114, etc. When the hierarchical project 100 is compiled, one or more of the control information 110 may be accessed based on references within document 103. The relatively simple hierarchical project 100 is for illustrative purposes only, and may include any number of topics 102, which each may include any number of documents 103. The body 104 of each document 103 may include a number of headings 105, paragraphs 106, and/or images or multimedia via reference 107.

Figure 2B:
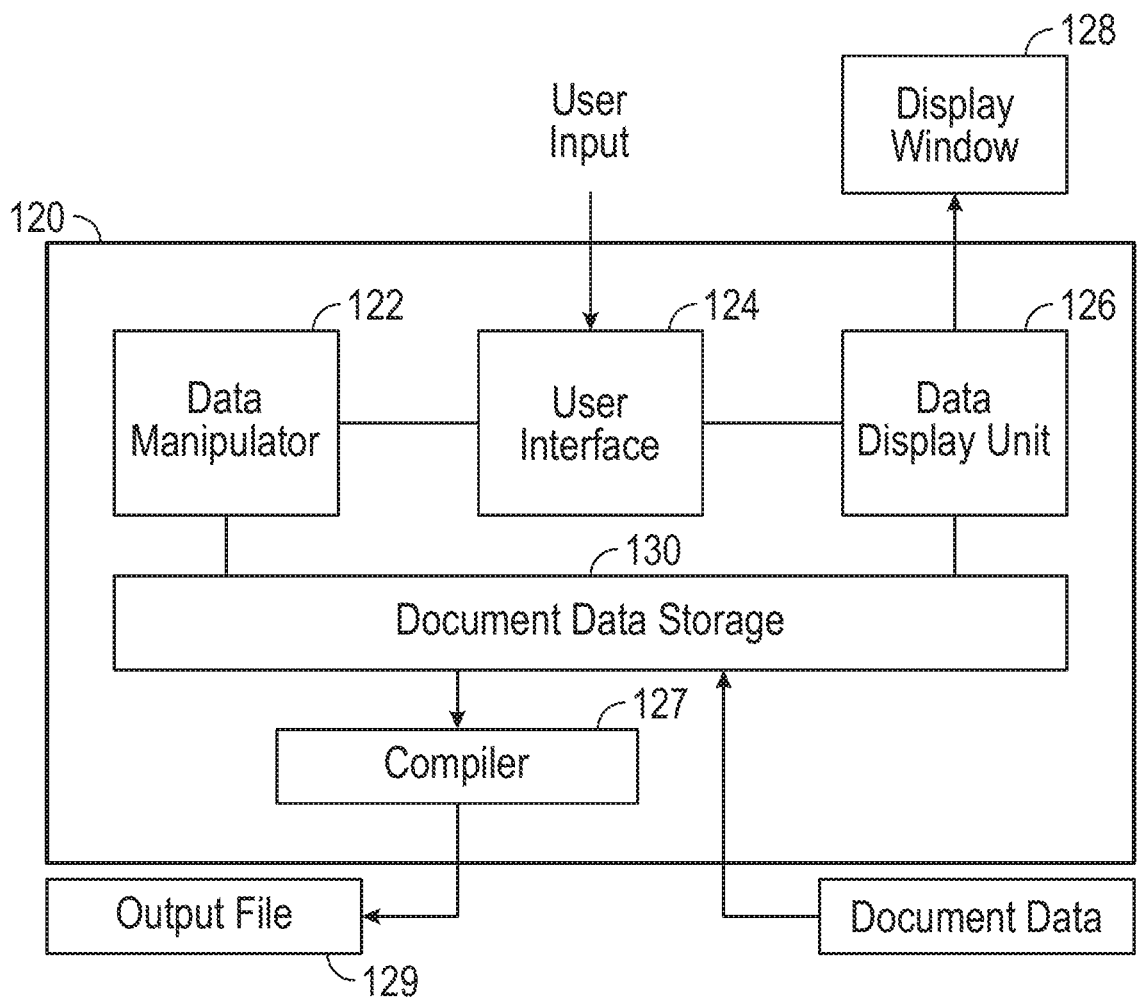
FIG. 2B is a block diagram of a data processing system which can process the hierarchical project shown in FIG. 2A.

FIG. 2B is a functional block diagram of a data processing system 120 which can process a document such as the document 103 of the hierarchical project 100 shown in FIG. 2A. In the illustrated embodiment of FIG. 2B, the data processing system 120 includes a data manipulator 122, a user interface 124, a data display unit 126, and compiler 127.

The user interface 124 receives input (e.g., keystrokes, touch screen, gestures, voice input, etc.) from an authoring user and sends the input either to the data display unit 126 to be processed and displayed and/or to the data manipulator 122 to manipulate the data. The user input can be a command, content (e.g., text), or other related input. The data manipulator 122 receives document data included as part of the project data, which may include text content, image data, multimedia data, document structure data, and other related data such as metadata, from a project data storage 130, and manipulates the received document data according to the user input. As used herein, "document data" refers to a single document included as part of the project data, which may be a content document (e.g., document 103) provided, for example, as content data and/or control information (e.g., control information 110) provided, for example, as a control data file. The manipulated document data is then stored in the project data storage 130. The data display unit 126 receives the user input from the user interface 124 and the document data from the project data storage 130, and processes the user input and the document data to generate a visual representation of the document data. The data display unit 126 ingests the document data and displays various components of the processed user input and the document data on a plurality of display panes 128 (collectively referred to herein as a "graphical user interface" or "GUI") in a manner which will be described in more detail below. The display panes 128 may include graphical visual representations of one or more panes for user interface, menus, icons, controls, tabs, etc., generated by the data display unit 126 and displayed on a display, such as a monitor, TV screen, display screen of a mobile device, display screen of a tablet or portable computing device, etc.

In an illustrative example, the user interface 124 may receive an input from the authoring user and send the input either to the data display unit 126 to be processed and displayed and/or to the data manipulator 122 to manipulate the data. The data manipulator 122 may create a phrase and/or micro content for storage in project data storage 130 based on user input as described in greater detail herein. In some embodiments, the data manipulator 122 may designate a portion or excerpt of content as micro content, for example, by receiving user input navigating to the portion and manipulating metadata to tag the designated content as micro content. The designated portion may be a content data file, control data file, or a portion thereof. Associations between content designated as micro content and phrases may be generated by the data manipulator 122 and stored in the project data storage 130 as a phrase map. The phrase map may be stored as phrase map data comprising one or more phrases associated with a reference indicative of the associated micro content, that is either data of the micro content itself and/or a link reference to the micro content. The data display unit 126 may receive the user input from the user interface 124 providing or identifying a phrase, process the user input to retrieve the associated micro content, and generate a visual representation of the portion of the document data designated as the associated micro content. The data display unit 126 displays various components of the processed user input (e.g., the phrase) and the associated micro content on one or more of the display panes 128 in a manner which will be described in more detail below.

Once a project is completed, the user interface 124 may receive the input from the user to compile the project data of the hierarchical project and generate a published output file 129. Based on the input, compiler 127 accesses the project data from project data storage 130 to compile the document data of the hierarchical project and build or generate the published output file 129, for example, an HTML5 output file that comprises a plurality of data files that define properties and content of the published project. For example, the compiler 127 may traverse the hierarchical project 100 and, in the order from top to bottom and left to right, translate the content data files (e.g., document 103) written in executable code format into an output that defines text displayed as 'abcdefghi' along with referenced image and/or multimedia items displayed adjacent to the text. The compiler 127 may traverse the content data files based in part on one or more of the control data files. For example, the compiler 127 may access one or more control data files (e.g., control information 110) based on references included in the content data files and apply the control information to the content to format and otherwise apply control conditions to hierarchical project 100. That is, the compiler 127 may receive project data from the project data storage 130 to build a published output file (e.g., an HTML5 output file) of the hierarchical project as defined by the content data files and control data files.

In some embodiments, the user interface 124 may receive the input from the user to compile a single document and generate a published output file 129 including the micro content and phrase map information. Based on the input, compiler 127 accesses the document (e.g., document 103) to compile the content data and and build or generate the published output file 129. For example, the compiler 127 may translate the content data of the document into an output that defines text displayed as 'abcdefghi' along with referenced image and/or multimedia items displayed adjacent to the text. The compiler 127 may traverse the content data based in part on one or more of the control data. For example, the compiler 127 may access one or more control data defining structure criteria and apply the control information to the content to format and otherwise apply control conditions to document 103. That is, the compiler 127 may receive content data of the document from the project data storage 130 to build a published output file as defined by the content data files and control data files.

Published output file 129 may also include various data files that define background information and processes that need not be executed until a computer system (e.g., computer, tablet, cellular phone, etc.) executing the published output file ingests inputs corresponding to the background information. For example, the published output file 129 may comprise a phrase map folder including one or more phrase files representative of phrases, each of which comprises the reference indicative of the associated micro content. The computer system may ingest input from a user, access the phrase map folder to identify phrase file that substantially corresponds to the phrase file, and then execute the reference of the associated micro content to graphically display the micro content, for example, as described in greater detail in connection to FIGS. 10-15.

Figure 2C:
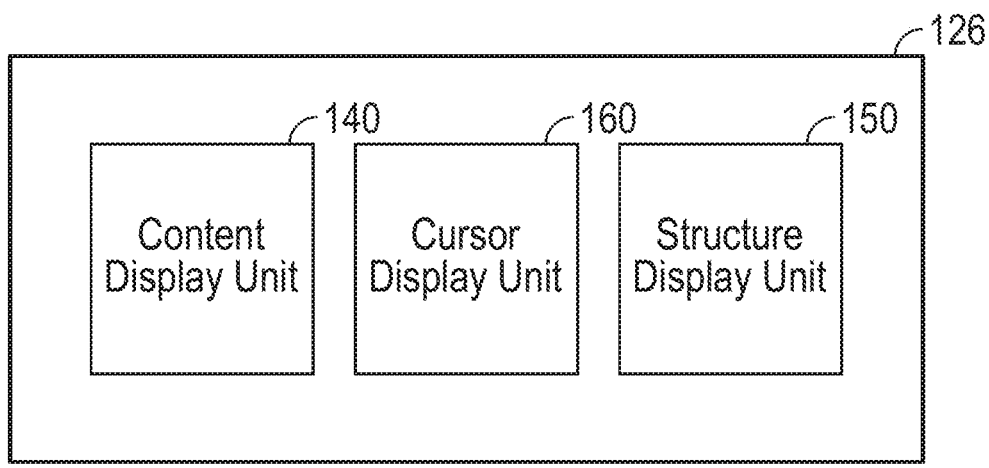
FIG. 2C is a detailed block diagram of a data display unit shown in FIG. 2B.

As illustrated in FIG. 2C, for example, the data display unit 126 includes a content display unit 140, a structure display unit 150, and a cursor display unit 160. In one embodiment, the content display unit 140 analyzes and displays the text content of the document data; the structure display unit 150 analyzes and displays information representative of the structure of the document data; and the cursor display unit 160 displays the configuration of the cursor that indicates the current location of text content processing. In examples described below, the structure display unit 150 displays the different components (e.g., content data files and/or control data files) of the hierarchical project in separate areas of the display panes 128. The operation of the data processing system 120, and in particular, the operation of the data display unit 126 and its associated units with respect to the display panes 128, is described below in detail in connection with FIGS. 2-15. Though the operation is described with reference to what is displayed to a user, it is to be understood that the display is generated by the units of the data processing system responding to user input and document data.

As an example operation with reference to FIG. 2, user interface 124 may receive a user input selecting phrase 212a from the phrase map 215 (e.g., phrase map data) and sends the input to data display unit 126. The phrase map 215 may be stored in project data storage 130 as a control data file in an executable code format. The data display unit 126 accesses the control data file for the phrase map 215 and executes the code text associated with the phrase 212a. That is, the data display unit 126 identifies the executable code text of phrase 212a, retrieves the executable code text associated with the phrase 212a for the corresponding micro content 220, and executes the executable code text to graphically display the micro content on display panes 128.

In another example, the user interface 124 may receive user input to create and/or edit the phrase 212a and/or corresponding micro content 220. In this scenario, the data manipulator 122 may receive an input and manipulate a corresponding document data as described here. For example, the manipulated document data may be a content data file or a control data file (e.g., a control data file corresponding to phrase map data of the phrase map 215 and/or landing pages control data file). The manipulated data may then be saved, thereby replacing the previously accessed document data. The data display unit 126 may generate a graphical display of the manipulated data on the display panes 128.

Figure 3:
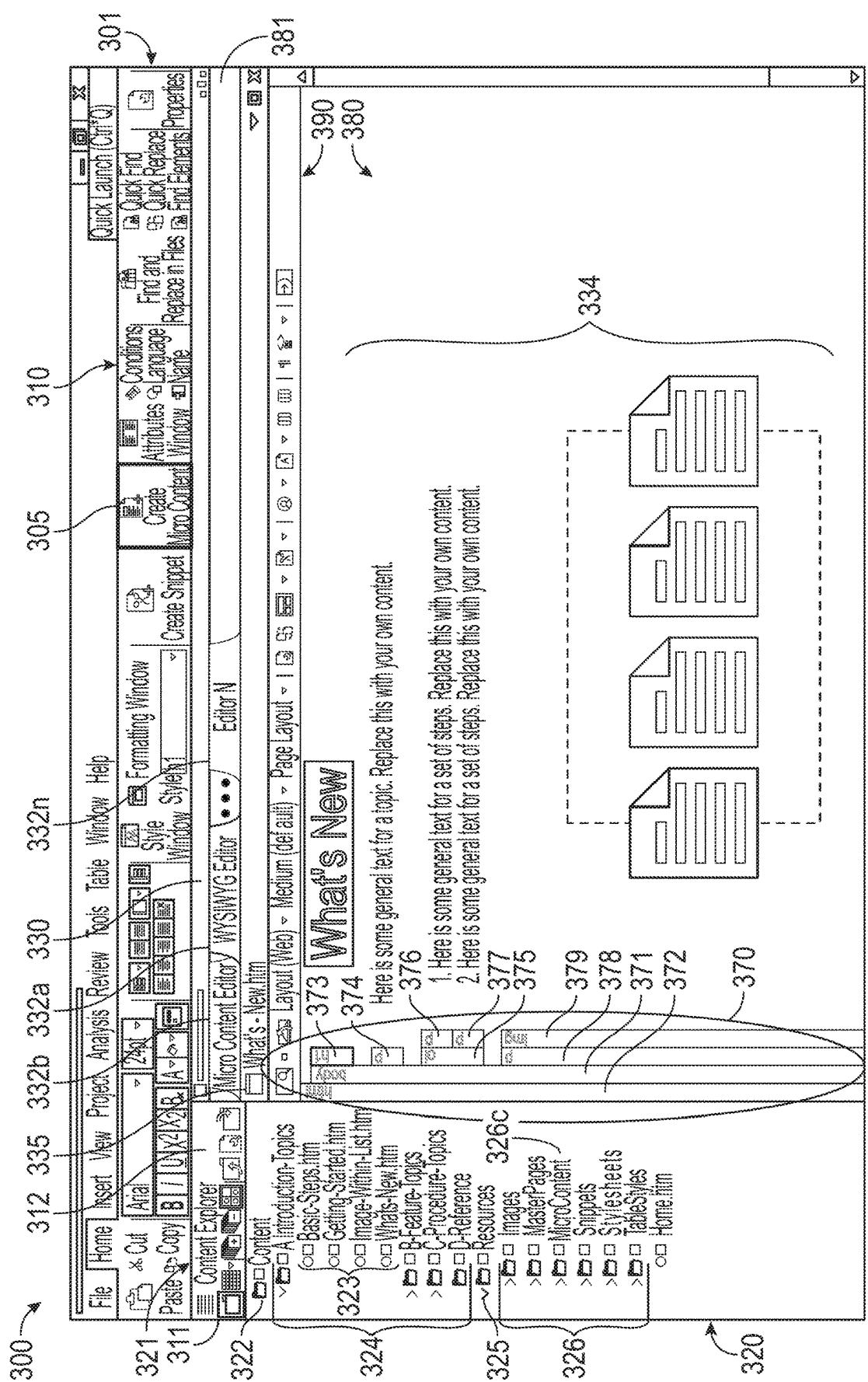
FIG. 3 illustrates an example graphical user interface for authoring the hierarchical project shown in FIG. 2A.

FIG. 3 illustrates an example GUI 300 for authoring a hierarchical project, such as the hierarchical project 100 of FIG. 2A. The GUI 300 graphically displays a plurality of panes 310-330 configured to facilitate creation and/or editing of components of the hierarchical project. The GUI 300 may be generated by the data display unit 126 and such that the display panes 128 may comprise display panes 310-330.

In the illustrated embodiment, upper pane 310 is configured to graphically display a ribbon toolbar 301 comprising a plurality of user interface icons for receiving input commands from the user. The ribbon toolbar 301 may permit access to and view of common input commands, for example, the ribbon toolbar 301 may include at least icon 305 configured to execute a micro content designation process in various embodiments. In some embodiments, the ribbon toolbar 301 may be customized by the user and/or based on previously inputted user commands.

The left pane 320 may be configured to graphically display a content explorer pane 321 that visually organizes and provides access to project data of the hierarchical project. For example, the content explorer pane 321 may graphically display the project data of the hierarchical project 100 described above. The content explorer pane 321 includes a toolbar 311 along an upper portion and graphically displays a file manager or browser arrangement having various abstraction levels of folder structure for collecting and visually organizing documents that make up the hierarchical project. For example, at a first abstraction level, all project data (e.g., content and control information) for the hierarchical project may be collected in folder 322. At a second abstraction level, folder 322 organizes content data files into folders 324, each corresponding to a given topic (e.g., topic 102) and organizes the control data files (e.g., control information 110) into folder 325. At a next abstraction level, each folder 324 collects one or more underlying documents 323 (e.g., document 103) that contain content for the respective topic. Each document, in various embodiments, may be a content data file in executable code format that may be executed for graphically displaying the contents therein. The folder 325 collects a plurality of subfolders 326 containing the various control information related to the overall project. For example, in the illustrated embodiment, folder 325 is expanded to graphically display subfolders 326 for holding control data files related to images and multimedia (e.g., images, videos, audio, etc.), landing pages (e.g., illustratively labeled as "snippets"), landing pages, page layouts, style sheets, and table styles, and subfolders 326c configured to visually collect phrase map data files. Thus, each folder 324 collects one or more underlying documents 323 making up the content of each topic folder 324, while each subfolder 326 collects control information utilized by the data display unit 126 to display content and/or by the compiler 127 to build the published output file. Folders may be added at various abstraction levels by selecting the add folder icon 312 from the toolbar 311 or by executing a contextual selection operation (e.g., a right click operation, voice command, gesture, similarly executed input command or shortcut keystroke, etc.) to trigger a pop-up window including options and commands overlaid on the GUI 300, where options included therein are to add, edit, or remove one or more folders.

Center pane 330 graphically displays a multiple data file interface (MDI) pane configured with an MDI bar 381 illustratively along the upper border and a center area 380 configured to display an editor that may be one of a plurality of interfaces (sometimes referred to herein as "editors") included in the GUI. Each document interface or editor may be a user interface configured to receive inputs from a user for modifying contents of the hierarchical project. The editor displayed in center area 380 is available to receive user input, and may be overlaid on one or more other editors that, while active to facilitate quick transition therebetween, may not be actively receiving user input. The editor bar 381 is configured to graphically display one or more editor tabs 332a-n each corresponding to active editors, with the editor currently receiving input graphically overlaid on the other active editors. In the illustrative example, there are two editor tabs 332a and 332b corresponding to an open document editor pane 335 and an open micro content editor pane (described in detail below), respectively, with editor tab 332a in front as it is the editor actively receiving user input and the contents of which is displayed in the center pane 330. While editors may be displayed in center pane 330, in various embodiments, an editor may be extracted from the center pane 330 and graphically displayed as a separate, floating display pane that may be placed at a user desired location.

FIG. 3 illustrates an example document editor pane 335 for representing and manipulating (e.g., processing) the underlying structure of a hierarchical project (e.g., a markup language document), while maintaining a What You See Is What You Get (WYSIWYG) environment, as described in U.S. Pat. No. 7,934,153, the disclosure of which is incorporated by reference herein in its entirety. In the illustrated example, a WYSIWYG editor pane 335 paired with a Visual Document Structure Indicator (VDSI) pane having side bar 370 is graphically displayed to allow for both WYSIWYG and structure editing of documents 323 within the interface of FIG. 3. Other example editors include, but are not limited to, internal text editor for viewing and editing underlying source code of the document (e.g., a XHMTL file where the document is an XHMTL document), table of contents editor, style sheet editor, and page layout editor, etc.

In the illustrative example, center pane 330 illustrates the WYSIWYG editor pane 335 configured with center area 380, pane toolbar 390 along the upper border, and a VDSI pane comprising side bar 370 illustratively along the left border (however, the side bar 370 may be positioned elsewhere within center pane 330). In the illustrated example, the side bar 370 includes elements representative of blocks of content displayed in the center area 380. In the side bar 370, the body 334 of the document is represented by element 371, the heading block is represented by element 373, a following paragraph is represented by element 374, the ordered list is represented by element 375, and the ordered list includes two entries represented by elements 376 and 377. A final paragraph is represented by element 378 and includes image and/or multimedia content represented by element 379 (e.g., an image accessed and executed by the underlying XHTML document). In the illustrated example, the heading element 373 is highlighted in the display to indicate that this is the block that is currently active (e.g., selected by a cursor and/or highlighted as shown in FIG. 3).

One aspect of the VDSI pane is that the system is not only a visual representation of the underlying structure of the document, but also provides for element level modification of the document at this structure level. Thus, the use of the VDSI pane provides a single editor with the benefits of both a WYSIWYG editing environment and a structure-based editing environment through a single interface. Furthermore, as further described in more detail herein and in U.S. Pat. No. 7,934,153, the disclosure of which is incorporated by reference herein in its entirety, a WYSIWYG display of the document is presented in center pane 330 such that the content of which and the underlying structure are both displayed and can be directly manipulated and edited using the WYSIWYG editor pane 335.

Figure 4:
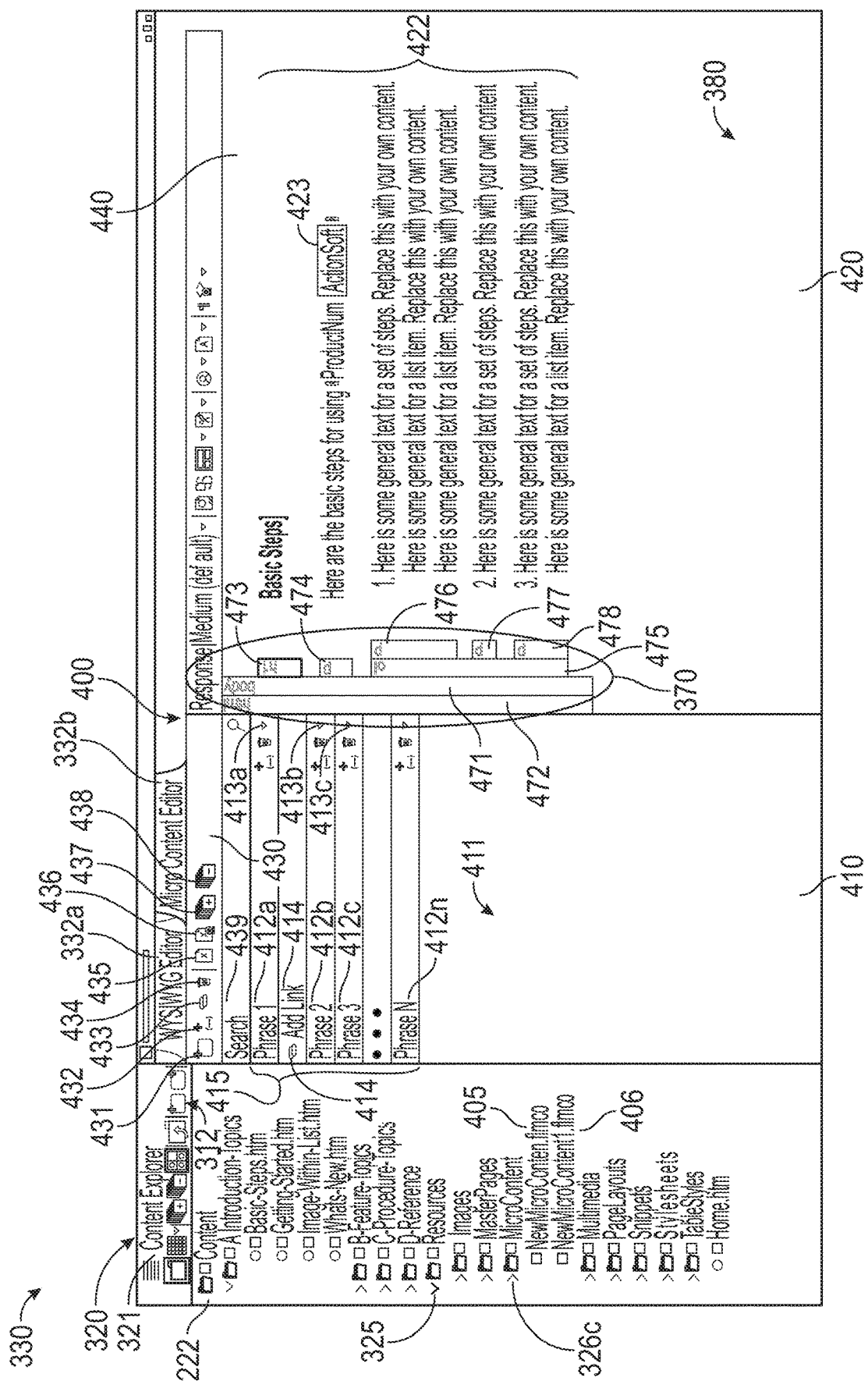
FIG. 4 illustrates another example of the graphical user interface of FIG. 3, with the upper pane removed.

FIG. 4 illustrates an example portion of GUI 300 with the upper pane 310 removed. FIG. 4 illustrates left pane 320 graphically displaying the content explorer pane 321 (as described above) and the center pane 330 graphically displaying an example micro content editor pane 400 overlaid on the WYSIWYG editor pane 335. In this configuration, the micro content editor pane 400 is actively receiving inputs and, thus, the editor tab 332b for micro content editor pane 400 is in front of editor tab 332a.

In the left pane 320, one or more data files (e.g., phrase map data files 405, 406) may be generated for storing phrase maps and micro content associated therewith (sometimes also referred to herein as a micro content file or phrase map data) and collected within folder 322 for the hierarchical project. Phrase map data files 405 and 406 may be example control data files as described above. In the illustrated example, data file 405 may be the phrase map comprising one or more phrases and one or more references indicative of associated micro content (referred to herein as "micro content reference"), each associated with at least one phrase. Micro content reference may be the micro content itself, for example, stored in the data file 405 in executable code format associated with one or more phrases. Additionally, micro content references may be a pointer (e.g., link or directory pathway) to designated document data or portion of a document data (e.g., a content and/or control data file) stored separate from the data file 405. For example, a link may be provided that refers to a content data file or portion thereof that is designated as micro content. Similarly, the link may refer to a control data file (e.g., control data file corresponding to a landing page) or a portion thereof. The micro content references included in the data file 405 may be executable code that instructs the data processing system 120 where to locate the micro content associated with a phrase. While embodiments herein describe the phase map data as stored in a phrase map data file 405, other implementations are possible. For example, the phrase map data may be stored as part of an electronic document (e.g., document 103). That is, phrase map data may be included in the document 103, but not displayed during viewing of the document 103 until the phrase map data is manipulated or accessed, for example, during a search or other usage of the phrase map data.

To create a data file 405, a subfolder 326 may be added to the content explorer pane 321, for example, by selecting the add folder icon 312 or executing a contextual selection operation and selecting an add folder option. In the illustrated example, subfolder 326 is added to the folder 325 by either highlighting folder 325 (or hovering over folder 325) and is named "MicroContent," however the subfolder 326 may be placed at any location within the hierarchical project corresponding to folder 322 and may be given any desired naming convention. Once subfolder 326 is created, the data file 405 may be generated by hovering over the subfolder 326 and executing a contextual selection operation (or by navigating the ribbon toolbar 301 to access and add content icon). This causes a context menu pop up window from which new content files can be requested. Selecting an "Add Micro content" option causes the system to generate a data file identified as a data file 405 based on a pre-stored micro content template. As such, the data file 405 may be provided with any desired name and still operate as a phrase map. In some embodiments, the data file 405 may have an extension that uniquely identifies the file type as a micro content file associated with a given editor, other data files may have other extensions. When a given data file is accessed by the data processing system, the data processing system may ingest the extension and open the corresponding editor pane in the MDI pane 380. For example, data file 405 may have the extension ".FLMCO" corresponding to the micro content editor pane 400, while a data file corresponding to document 323 may have the extension ".htm" corresponding to the WYSIWYG editor pane 335. Multiple micro content files, including data files 405 and 406, may be separately created and organized within the subfolder 326 and stored in the project data storage 130. Creating multiple micro content files may provide a means for organizing phrase maps serving different purposes, for example, where one phrase map is to be used for search results while another will be used for chatbots.

Once the data file 405 is created, the micro content editor pane 400 may be triggered and graphically displayed in center pane 330. If data file 405 is a newly generated file, then the micro content editor pane 400 may automatically be displayed in response to creation of data file 405, while, if the data file 405 existed previously, selecting the data file 405 may open the micro content editor pane 400. If any other editor is displayed in center pane 330, the micro content editor pane 400 may be graphically displayed overlaid on the other editor.

The micro content editor pane 400 may be divided into a plurality of panes for providing a graphical user interface for creating, editing and viewing the data file 405. For example, the micro content editor pane 400 may be implemented as two panes, a first pane graphically displaying a phrase map pane 410 configured to display a phrase map 415 and phrases 412*a-n* (collectively "phrases 412") and a second pane graphically displaying a micro content pane 420 for displaying micro content (e.g., micro content 422) associated with at least one of the phrases 412. Selecting one of phrases 412 from the phrase map 415 causes the associated micro content to be generated in the micro content pane 420, for example, as described above in connection to FIG. 4. In the illustrated example, phrase 412*a* is selected causing the micro content 422 to be graphically displayed in micro content pane 420.

The phrase map pane 410 may include a center area 411 for graphically displaying the phrase map 415, a toolbar 430 at an upper portion and comprising a plurality of user interface icons 431-438 for receiving input commands from the user, and a search bar 439 between the phrase map 415 and toolbar 430 and configured for searching the phrase 412 based on text entered into the search bar 439. The toolbar 430 may be utilized to create, edit, and manage the phrase map 415 (or underlying executable code text) and associations stored therein. For example, the toolbar 430 may include icon 431 for adding a new phrase, icon 432 for associating a phrase with another phrase and/or micro content (referred to herein as alternative phrases), icon 433 that causes a dialogue to open through which micro content can be designated and associated with a selected phrase and, after associating therewith changes to another icon for removing the association, icon 434 for deleting phrases and any other information contained in the data file 405 associated with the selected phrase; icon 435 for inserting variable definitions into a phrase; icon 436 for toggling between hiding and showing variable definitions (e.g., variable definition 423); icon 437 for expanding drop down menus to show information associated with each phrase in the phrase map 415; and icon 438 for collapsing all expanded menus in the phrase map 415. Each of these commands may also be accessed by selecting a phrase 412 (or hovering over a phrase 412) and executing a contextual selection operation, which generates a drop down menu comprising the commands outlined above.

As illustrated in FIG. 4, the displayed phrase map 415 may graphically display phrase 412 as a list; however phrases 412 may be displayed as a grid or other graphically displayable format. As illustrated in FIG. 4, selecting the down arrow 413*a-n* of a phrase (or selecting the phrase itself) causes a drop down menu to expand which graphically displays information corresponding to the selected phrase 412 (e.g., stored in data file 405 in association with the selected phrase 412). For example, any associated micro content and/or alternative phrases.

In the illustrated example, the phrase 412*a* is selected and may be associated with a micro content 422 stored in the data file 405, that is data file 405 is provided in executable code format associated with the phrase for generating the micro content 422. The micro content pane 420 may graphically display the micro content 422 in a response WYSIWYG editor pane 440 configured for creating and editing micro content 422 from within the micro content pane 420. The response WYSIWYG editor pane 440 may be substantially similar to the WYSIWYG editor pane 335 described above with reference to FIG. 3. That is, the response WYSIWYG editor pane 335 may be configured with a center area 380, a pane toolbar 390, and a VDSI pane including a side bar 370. In the illustrated example, the side bar 370 indicates elements corresponding to blocks of content displayed in the center area 380 (e.g., the content of the micro content 422). In the side bar 370, the body of micro content 422 of the document is represented by element 471, the executable code is represented by element 472, the heading block is represented by element 473, a following paragraph is represented by element 474, and an ordered list is represented by element 475 having items represented by elements 476-478. While not illustrated in FIG. 4, the micro content 422 may also include any content designated to be micro content, which may include one or more of text, tables, variable references to other portions of the hierarchical project, cross references for other control character documents (e.g., landing pages or bookmarks), and any image and/or multimedia content (e.g., an image accessed and executed based on the underlying executable code text) or any other markup and/or formatting. As described above, response WYSIWYG editor pane 440 may be utilized to create and edit the micro content 422 and generate executable code text that is graphically displayed in the response WYSIWYG editor pane 440. As the response WYSIWYG editor pane 440 in this implementation is executed based on a phrase 412, the resulting content is stored as the micro content 422 for the selected phrase 412. Thus, the response WYSIWYG editor pane 440 may be used to create and modify executable code text for generating micro content 422 that is stored in association with the phrase 412a.

Figure 5:
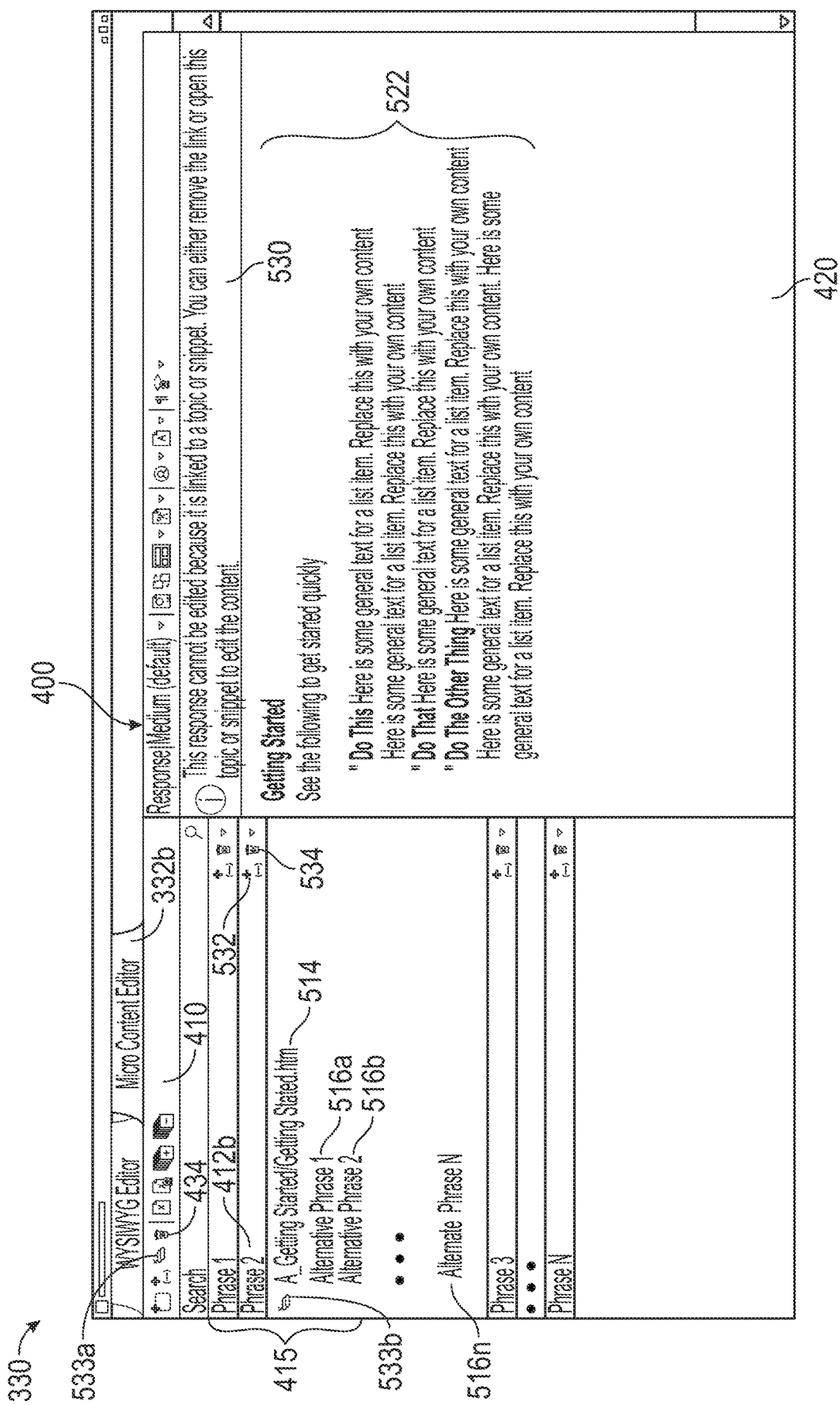
FIG. 5 illustrates another example of the graphical user interface of FIG. 3 with the upper pane and left pane removed.

FIG. 5 illustrates another configuration of the GUI 300 of FIG. 3 with the upper pane and left pane removed. FIG. 5 illustrates the micro content editor pane 400 of FIG. 4, where a micro content 522 is associated with the phrase 412b via a link 514. In the illustrated example, micro content 522 may be associated with the phrase 412b by generating a link 514 to content of the hierarchical project designated as micro content 522 and associating the link 514 with the phrase 412b. For example, by selecting the icon 433 or clicking on 414 (e.g., "add link" icons) from the drop down menu (see FIG. 4) for phrase 412b, a dialogue window (not shown) is generated overlaid on the panes 410, 420 (or any open display pane) which displays a file browser of the hierarchical project (e.g., similar to the folder organization shown in content explorer pane 321). Navigating through the folders, desired content may be selected, for example, by selecting any document data (e.g., documents 103 or control information 110). A link 514 referencing the directory location of the designated document data is then generated and stored in association with the executable code text of the phrase 412b within data file 405. Link 514 may be deleted by selecting the remove link icon 533a or 533b, which are displayed upon creating the link 514. In another implementation, a contextual selection operation on a selected phrase (e.g., phrase 412b) generates the drop down menu described above, from which the option to select a new link can be selected that accesses the above described dialogue window for selecting a new link. In some implementations, associating responses and phrases using the configuration in FIG. 5 may result in the entire selected document being designated as a response for a given phrase.

As the micro content 522 displayed in micro content pane 420 corresponds to a document of the hierarchical project (e.g., a content data file, such as document 103), the content of micro content 522 may not be modified from the micro content pane 420 as indicated by notification message 530 displayed along the upper portion of the micro content pane 420. Instead, the document corresponding to the micro content 522 can be accessed by selecting on the link 514 in the drop down menu or by executing a contextual selection operation and selecting open link. This retrieves the document and displays the content in a new WYSIWYG editor pane 335 (e.g., the center pane 330 graphically displays the WYSIWYG editor pane 335 overlaid on the micro content editor pane 400) for editing the underlying document. As such, the underlying document may be modified, without necessitating changes be made to the data file 405. Additionally, a convert to text operation is provided, for example, in the drop down menu. Selecting the convert to text operation, the content of the underlying document designated as micro content 522 may be copied and stored in the data file 405 and associated with phrase 412b. This operation may remove the link and open the micro content pane 420 as described above. That is, the executable code text of the micro content 522 is copied and stored to the data file 405 in association with the phrase 412b.

Also illustrated in FIG. 5 are additional or alternative phrases 516a-n that may be associated with the micro content 522. That is, a given micro content (e.g., micro content 522) may be associated with one or more phrases included in the phrase map. Similarly, a subset of phrases 516a-n of the phrase map may be associated with a given phrase and micro content (e.g., the phrase 412b and micro content 522 pair). As used herein, phrases 516a-n may be referred to as alternative phrases, in the sense that they are alternative phrases that correspond to a common response, and not necessarily that the phrases are alternatives of each other or the linked to phrase (though that is a possibility). Phrases 516a-n may be added by selecting icon 432 or icon 532. Associations between phrases 516a-n and phrase 412b may be removed by selecting the delete icon 434 or 534.

Figure 6:
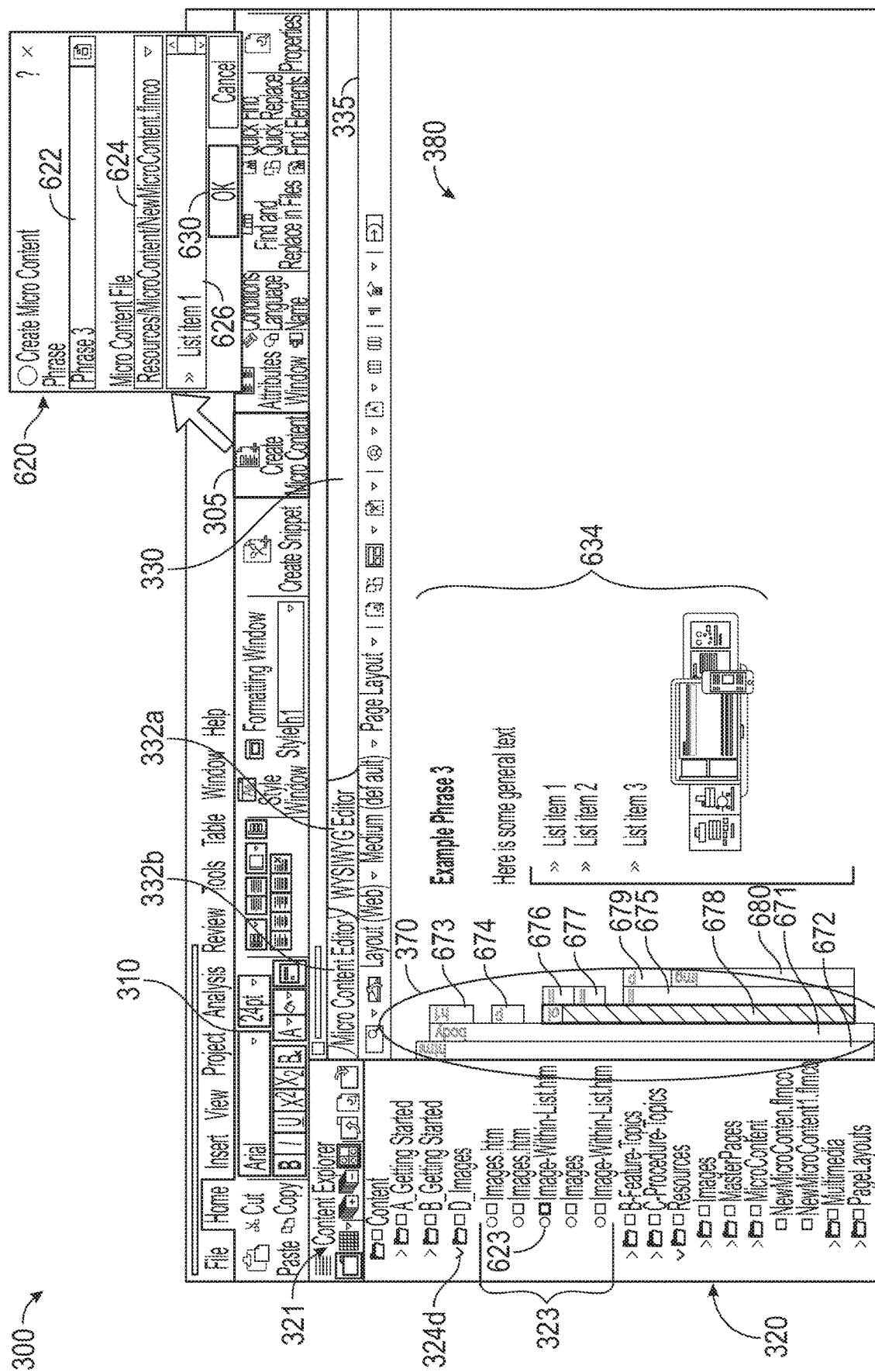
FIG. 6 illustrates another example of the graphical user interface of FIG. 3.

FIG. 6 is another configuration of the GUI of FIG. 3. The configuration of FIG. 6 illustrates the content explorer pane 321 in a left pane 320, the ribbon toolbar 301 along an upper pane 310, and the WYSIWYG editor pane 335 configured with a VDSI pane and side bar 370 along the left board. Not only can associations be created in the micro content editor using the processes described in connection to FIGS. 4 and 5, the configuration of FIG. 6 may provide for selection of content from existing project data, designating the selected content as micro content, and associating the micro content with a phrase. Unlike the configuration in FIG. 5, the configuration in FIG. 6 allows for selection of less than the entire document (e.g., less than all of the content therein), for example, by opening the document and selecting only a portion desired to be designated as micro content.

In the illustrated example, the content explorer in left pane 320 may be used to navigate to desired content. Here, document 623 is selected in content explorer pane 321 and corresponding content is graphically displayed in the center pane 330 via the WYSIWYG editor pane 335. That is, executable code text stored in document 623 is executed to display body of displayed content 634 in center area 380. In the side bar 370, the document 623 is represented by element 672, the body 634 of the document 623 is represented by element 671, the heading block is represented by element 673, a following paragraph is represented by element 674, an ordered list is represented by element 678, and the ordered list includes three entries represented by elements 676, 677, and 675. The third entry of the ordered list includes a paragraph represented by element 679 and an image or multimedia content represented by element 680.

Once the document 623 is displayed, a portion of the displayed content 634 may be selected and designated as micro content. In the illustrated example, the element 678 is highlighted indicating that the ordered list block of content 634 that is currently active (e.g., selected by a cursor and/or highlighted as shown in FIG. 6). Having selected the desired content, clicking on the micro content creation icon 305 from ribbon toolbar 301 in upper pane 310 or executing a contextual selection operation and selecting a create micro content option generates a dialogue pop up window 620. A phrase to be associated with the selected content can be entered in phrase field 622. The entered phrase may be any desired phrase or word and need not be a phrase already included in the phrase map. The phrase may be a phrase that currently exists in the phrase map 415 (e.g., phrase 412c as illustrated here) or a new phrase that can be created and stored in the phrase map 415. The directory pathway in a data file field 624 (illustratively labeled as "Micro Content File" field) identifies the data file (e.g., data file 405) where the association of phrase and response is to be stored. If the project has more than one micro content file, data file field 624 may be populated with a selected data file or with more than one data file. A preview window 626 displays a preview of micro content. Selecting "Ok" icon 630 designates the selected content as micro content, updates the identified data file (e.g., data file 405) with the phrase identified in phrase field 622, and associates the micro content with the phrase.

Figure 7:
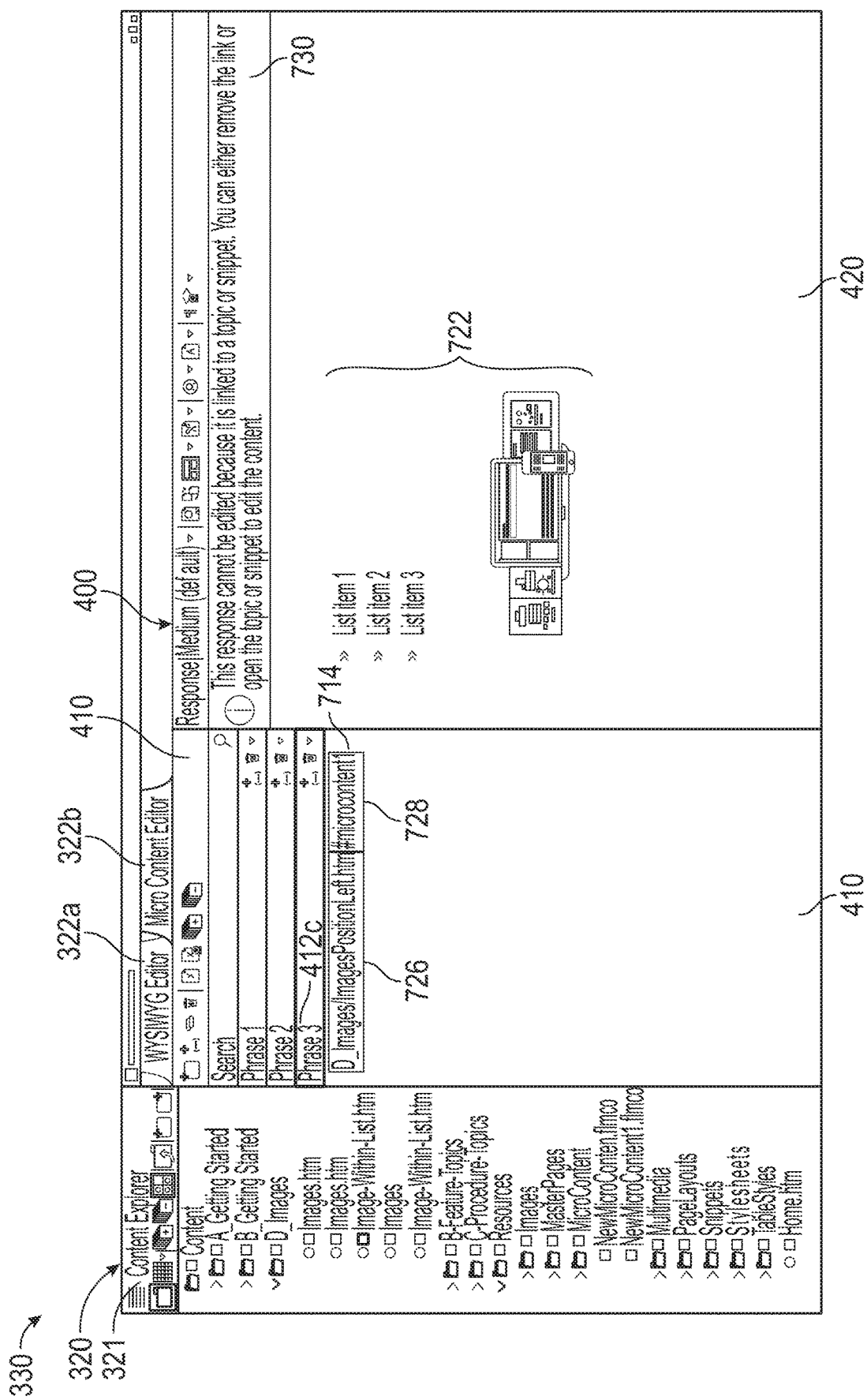
FIG. 7 illustrates another example of the graphical user interface of FIG. 3 with the upper pane removed.

FIG. 7 illustrates another configuration of the GUI 300 with the upper pane 310 removed. The configuration of FIG. 7 is similar to the configuration of FIG. 4, but illustrates the update phrase map 415 following the configuration of FIG. 6. That is, the phrase map 415 is updated to associate the phrase 412c with micro content 722 as designated in document 623.

In the illustrated example, left pane 320 graphically displays the content explorer pane 321 and the center pane 330 graphically displays the micro content editor pane 400. Following designating content as micro content and selecting a phrase as described with reference to FIG. 6, the phrase map 415 is updated, for example, by updating phrase 412c (e.g., entered in the phrase field 622 of FIG. 6) and generating the link 714 (e.g., a link to the selected content stored in a document 623 at the linked location) associated with the phrase 412c. In the illustrated example, the phrase 412c is associated with the link 714 that directs the data manipulator 122 and/or data display unit 126 to the document 623, and the content corresponding to the micro content 722 is displayed in the micro content pane 420 of micro content editor pane 400. In the illustrated example, since the content for the micro content 722 is stored in document 623, the content displayed in the micro content editor pane 400 may not be edited as indicated by notification message 730. Instead, the document 623 may be edited by navigating to document 623 and editing document 623 directly using the WYSIWYG editor pane 335. However, the micro content may be converted to text and stored directly in the data file 405 as described above.

As shown in FIG. 7, the link 714 may comprise the directory pathway 726 to the document 623 and an identifier 728. The directory pathway 726 corresponds to the document 623 while the identifier 728 may be a tag for locating content within document 623 designated as micro content 722. The identifier 728 may be utilized by the data manipulator 122 and/or data display unit 126 to identify that portion of the content of document 623 selected as the micro content 722 and execute the executable code text of that portion.

Figure 8:
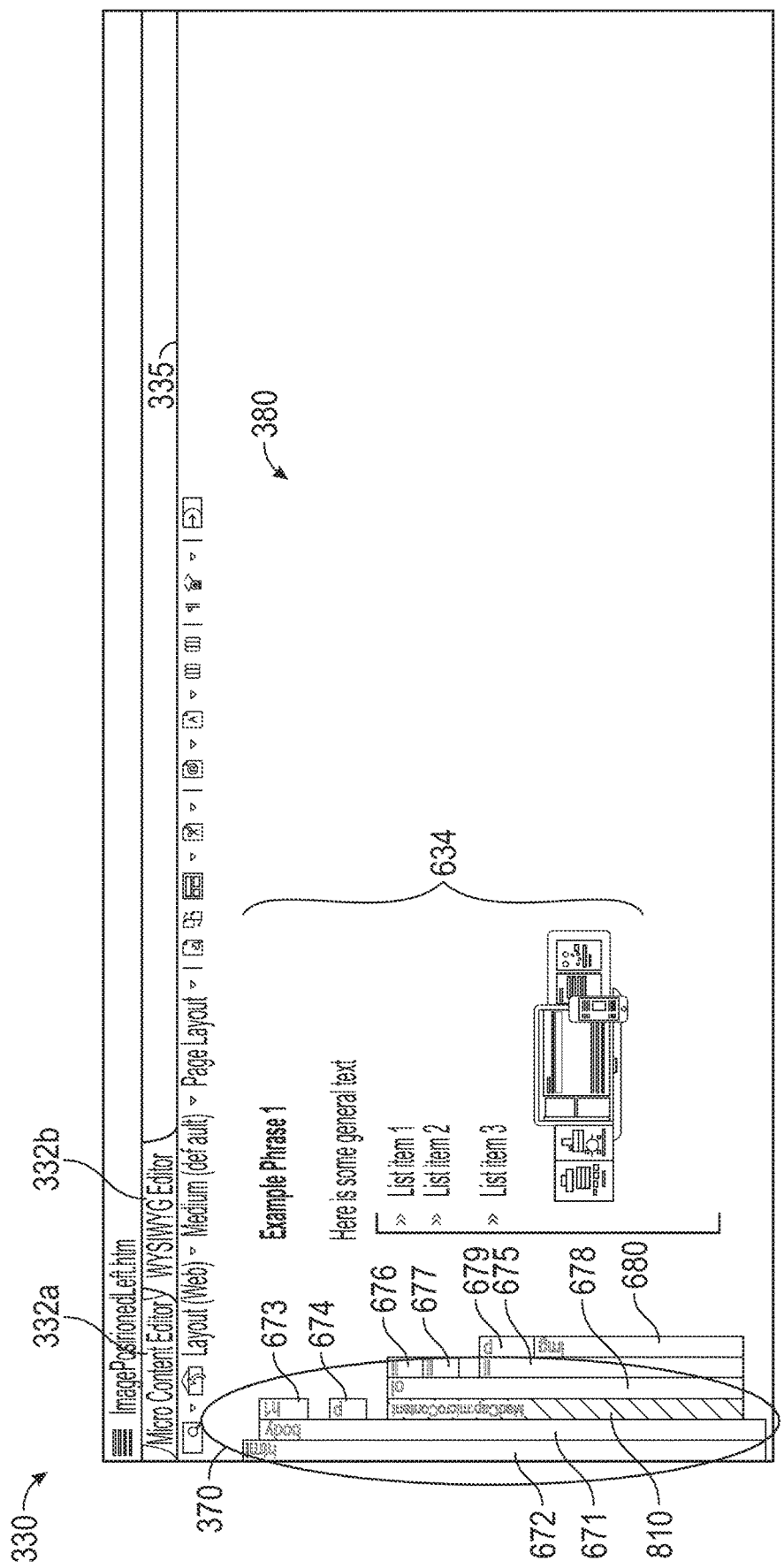
FIG. 8 illustrates another example of the graphical user interface of FIG. 3 with the upper pane and left pane removed.

FIG. 8 is another example configuration of the configuration of FIG. 6 with the upper pane 310 and left pane 320 removed. As in FIG. 6, FIG. 8 shows document 623 graphically displayed in the WYSIWYG editor pane 335 with the body 634 in the center area 380 and the side bar 370 as described above. Additionally, as element 675 corresponding to the ordered list was designated as micro content 722, the side bar 370 is updated to include element 810 that represents a tag identifying the element (e.g., element 675) that corresponds to content designated as micro content 722. By using this approach, in the published output file, searching for phrase 412c causes only the designated content (e.g., the ordered list) to be displayed absent other, non-designated portions of document 623.

FIGS. 9A-9C illustrate example data files generated by the data processing system 120 shown in FIG. 2B. The data files may be generated by the data manipulator 122 and configured for storing data used in the various embodiments described herein. FIG. 9A illustrates an example data file 905 comprising executable code text corresponding to a phrase map and associations between phrases and micro content. The data file 905 illustrated in FIG. 9A is representative of the data file 405 as described herein and is merely an illustrative example of the format and organization of a data file that is generated by the data processing system 120. The data file 905 includes the executable code text 910 (e.g., an XHTML document) defining the plurality of phrases 412 of the phrase map 415 and the associated micro content 422, 522, and 722.

The executable code text 910 may be retrieved from project data storage 130 and executed to graphically display the phrases and responses in phrase map pane 410 and micro content pane 420, for example, retrieved by the data display unit 126 from project data storage 130 and displayed on display panes 128. For example, the data file 905 includes executable code text 911 representing the phrase 412a, executable code text 912 representing the phrase 412b, and executable code text 913 representing the phrase 412c. The data file 905 also illustratively includes executable code text 914 representing a micro content 422 associated with phrase 412a, for example, as generated using the configuration described in connection to FIG. 4; executable code text 915 representing a micro content 522 associated with phrase 412b, for example, as generated using the configuration described in connection to FIG. 5; and executable code text 916 representing a micro content 722 associated with phrase 412c, for example, as generated using the configuration described in connection to FIGS. 6-8.

In the illustrated embodiment, micro content based on executable code text 915 and 916 are links to document data of the structure project (e.g., documents 103) stored separate from the data file 905. For example, when the executable code text 915 is executed, the system retrieves data file 920, shown in FIG. 9B, corresponding to the referenced document (e.g., a data file corresponding to a document 102). The data file 920 comprises executable code text 925 utilized to generate the content of the document designated by the link 514, which is graphically displayed by the system. Similarly, when the executable code text 915 is executed, the system retrieves data file 930, shown in FIG. 9C, for the referenced document 623, the data file 930 comprising executable code text 935 utilized to generate the content of the document 623. However, unlike data file 920, data file 930 also includes tags 932 and 934 that designate the portion of the document 623 as micro content 722. The first tag 932 and second tag 934 may encompass the portion of data file 920 designated as micro content, for example, by identifying the beginning and end, respectively, of the designated content. Tags 932 and 934 may correspond to the element 810, and, when executed, cause the system to display only that content defined by executable code text 936 between the tags 932 and 934.

While examples herein are provided that designate portions of content data files as micro content, it will be appreciated that any project data may be so designated. For example, as referenced above, certain control data files or portions thereof may be designated as micro content. For example, a snippet or landing page may be included in the control data files, which may be designated as micro content using the processes described above in connection to FIGS. 5-8.

As described above, in connection to FIG. 2B, a published output file (e.g., published output file 129) may be generated by the compiler 127. Where the project includes micro content as described herein in connection to FIGS. 2-9C, the published output file may include a phrase map folder comprising a plurality phrase files, each representative of a phrase from the phrase map and comprising the micro content reference associated therewith. Each phase file may be uniquely identified by a unique XML extension that includes the corresponding phrase and be provided in executable code format ingestible by external devices for displaying the associated micro content. In some embodiments, the phrase map folder may be generated without the need to compile the entire hierarchical project. That is, in some embodiments, the published output file 129 may be the phrase map file alone (e.g., only the phrase map folder). For example, the compiler 127 may be configured to access the data file 405 and designated micro content included therein or in other linked documents (e.g., documents 103) to generate the phrase map folder in a manner similar to that described above in connection with FIG. 2B.

FIG. 10 illustrates an example data file generated as part of the published output file for the structure project described herein. The data file of FIG. 10 illustrates an example phrase file comprising example executable code text 1000 that corresponds to phrase 412c as identified by the unique XML extension 1005. The executable code text file 1000 comprises executable code text 1010 identifying the phrase 412c and executable code text 1020 corresponding to the micro content 722. For example, a system (e.g., server, computer, tablet, mobile phone, etc.) may be coupled to a database or storage device configured to store a phrase map folder that includes the phrase file of FIG. 10. The phrase map folder may comprise a plurality of phrase files, each corresponding to a phrase from the phrase map. The system may receive an input from another device (e.g., server, computer, tablet, mobile phone, etc.), ingest the input, and locate the phrase file corresponding to the ingested input in the phrase map folder. In the illustrated example, the input may include phrase 412c which is used to locate the phrase file illustrated in FIG. 10. The system may then execute the executable code text 1000 to graphically display the micro content 722 based on the executable code text 1020. The input may include the exact phrase or be substantially similar to the phrase, for example, to take into account typographical errors and/or known contextual variations of the terms (e.g., "snippet" as compared to "snippets").

The phrase map folder and executable files included in the published output file may be utilized in numerous ways to improve user experience when searching and interacting with the published output file. The phrase map folder may be utilized by search engines, database search tools, artificial intelligence and machine learning applications, and other analysis methods to leverage utilization of a phrase to retrieve targeted, relevant information. The phrase map folder may be used, for example but not limited to, search result applications, frequently asked question (FAQ) databases, chatbot applications, machine learning applications, virtual reality and/or augmented reality instruction applications, field-level help applications, etc. To use the phrase map folder for search results and other applications the feature needs to be enabled in the published output file via the GUI. For example, accessing the published output file, selecting a search icon, and, from a search engine selection section, selecting search or elasticsearch. Expanding an advanced search option menu and selecting enable micro content results provides the necessary credentials for utilizing the phrase map folder. Now, external systems (e.g., a user operating their computer, mobile device, tablet, etc.) accessing the published output file may utilize the phrase map folder to facilitate searches and other applications.

FIG. 11 illustrates a display pane 1105 graphically displaying search results 1100 in a display pane 1105 based on a phrase map in accordance with embodiments herein. For example, an external system may supply an input including a search term 1110 for a search. The search term 1110 may be received by a system comprising a processor coupled to a database storing the phrase map folder. The processor executes software instructions to locate a phrase file in the phrase map based on the search term (e.g., matching the search term with the unique XML extension). Where there is a match or the search term 1110 is similar to a phrase included in the phrase map, the system accesses the phrase file and executes the code therein to graphically display the micro content associated therewith. That is, in the illustrated example, a search is performed in a search engine coupled to the phrase map folder of a published output file for the term 1110, "apply condition." The processor accesses the phrase map folder, identifies a unique XML extension for a phrase file based on the received search term 1110, and executes the corresponding executable code text to display micro content 1120. The micro content 1120 is then graphically displayed in display pane 1105, and illustratively includes text 1122 and images or multimedia 1124 (e.g., images, videos, audio, etc.) as designated as micro content associated with the phrase based on term 1110. Accordingly, by associating pointed content to phrases, accuracy and relevance of the information returned in searches may be improved.

In some embodiments, the graphically displayed micro content 1120 may appear above regular search results 1130, thus making the micro content 1120 especially valuable. In other words, this targeted result information is clearly viewable before anything else, rather than buried among the rest of the results. The response may be expanded to show additional information or minimized via interaction with the arrow 1125.

Figure 12:
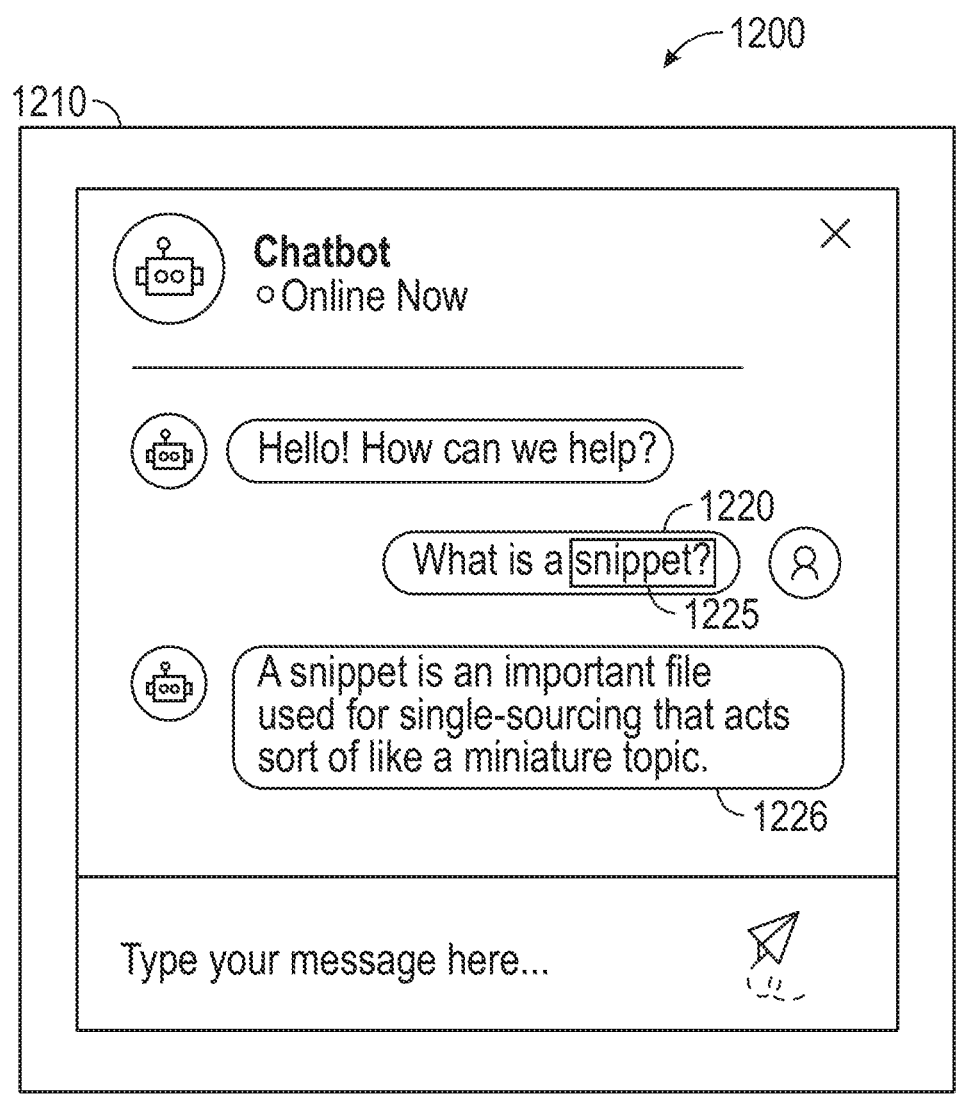

FIGS. 12-15 illustrate various other examples of usage of the phrase map folder included in the published output file. FIG. 12 illustrates an example display pane 1200 graphically displaying a chatbot 1210 configured to utilize the phrase map folder. Chatbot 1210 may be displayed as an instant message service configured to receive user inputs and respond to the inputs with relevant information. The chatbot 1210 may be software executed by a computer system as described above in connection to FIG. 11 and communicatively coupled to a memory comprising the phrase map folder. In the illustrated embodiment, a user may input a message 1220 that includes a term 1225 to the chatbot 1210. The chatbot 1210 receives the message, ingests the term 1225, accesses the phrase map folder and identifies a phrase file based on a unique XML extension that is at least similar to the term 1225. The chatbot 1210 may then access the phrase file, execute the executable code text therein, and graphically display the micro content therein in display pane 1200 as response 1226.

Figure 13:
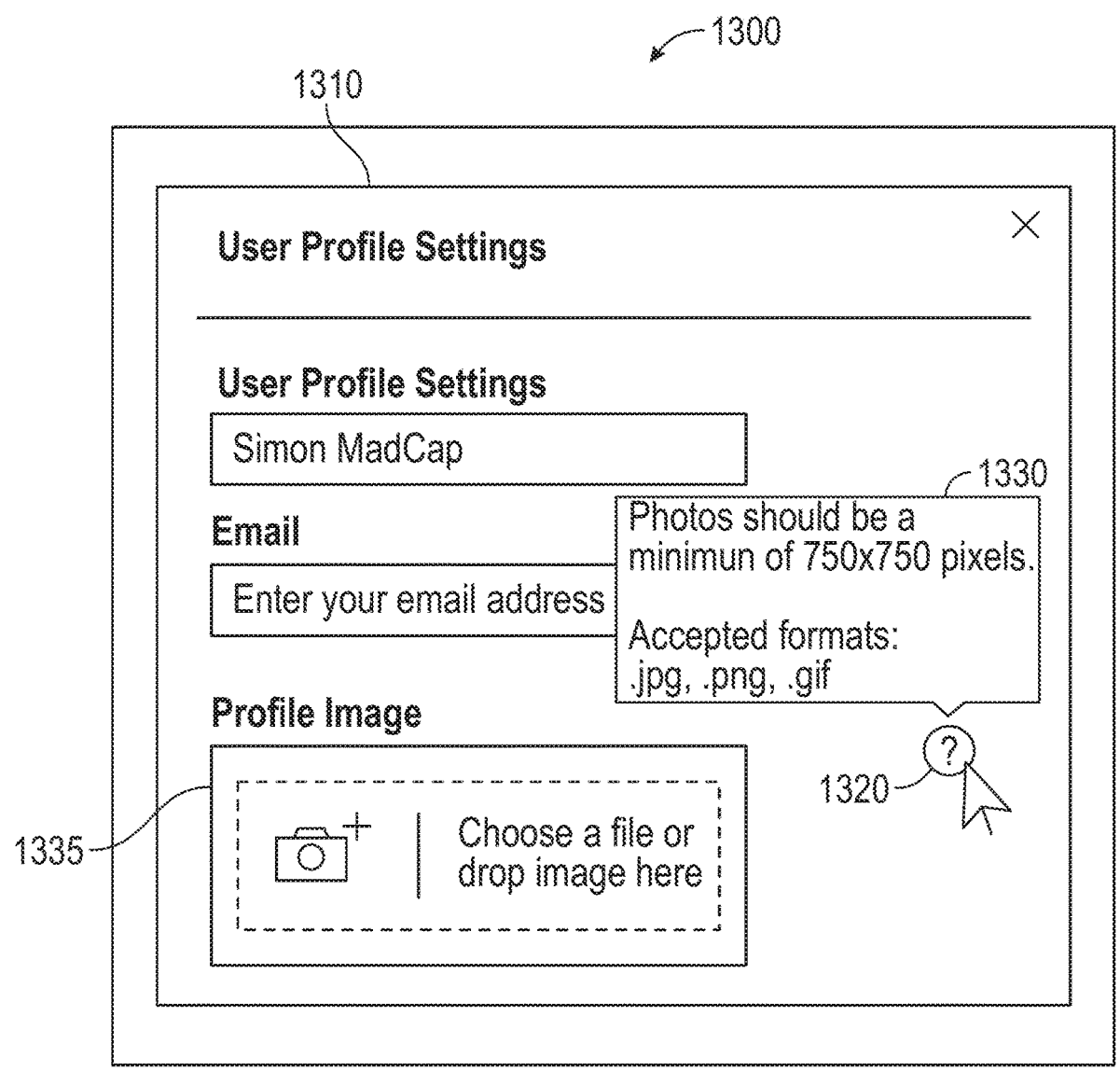

FIG. 13 illustrates an example display pane 1300 graphically displaying an electronic form 1310 that a user may complete via an Internet browser or other computer system.

The electronic form 1310 may include icon 1320 (e.g., "?") for pop up access to information to assist in completing the electronic form 1310. Interaction with the icon 1320 may cause a computer system to retrieve information corresponding to a part of the form identified based on the icon and graphically display relevant information. In the illustrated example, icon 1320 may be programmed to correspond to a phrase. When a user interacts with icon 1320 (e.g., selects or hovers over the icon 1320), the computer system executing the electronic form 1310 ingests the phrase and locates a phrase file in the phrase map folder based on the input. The executable code text of the phrase file is executed such that the micro content therein is graphically displayed as information 1330 useful for completing section 1335 of the electronic form 1310.

Figure 14:
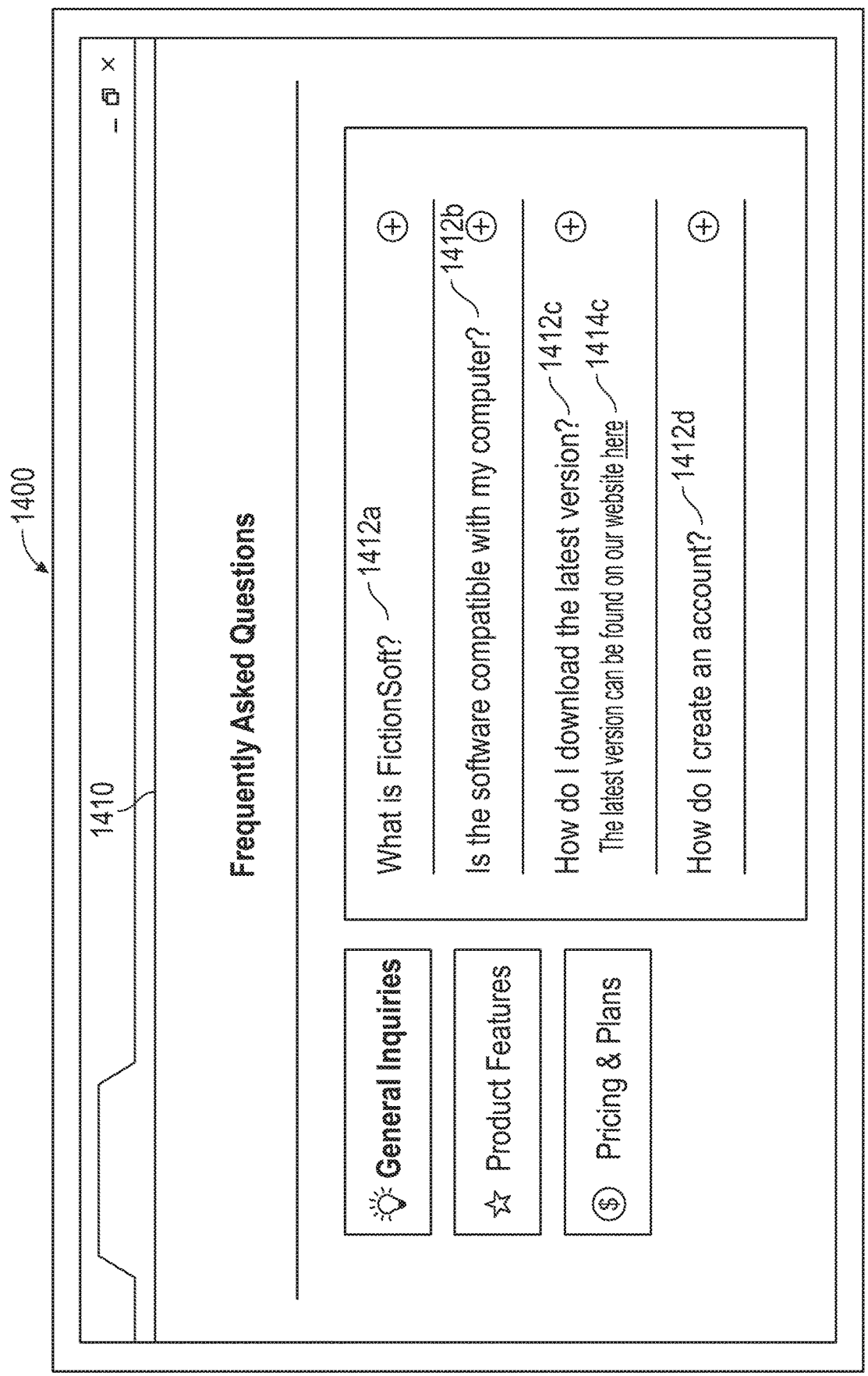

FIG. 14 illustrates an example display pane 1400 graphically displaying a frequently asked questions ("FAQ") pane 1410. The FAQ pane 1410 may graphically display a plurality of elements 1412a-d (collectively elements 1412) representative of an FAQ database storing a plurality of FAQs in association with answers (e.g., each element 1412 corresponds to an FAQ for retrieving an answer). The FAQ pane 1410 may be accessed by users via an external system or device. The FAQ database may comprise a phrase map folder, such that each FAQ element 1412 may correspond to a phrase of the phrase map folder and each answer corresponds to micro content. Thus, in the illustrated embodiment, when any one of the elements 1412 are selected, the system operating the FAQ database ingests the phrase programmed into the element 1412 and locates the phrase file in the phrase map folder. The executable code text of the located phrase file is executed and the associated micro content is graphically displayed as the answer to the FAQ to the selected element 1412, for example, the micro content 1414c is displayed for FAQ element 1412c.

Figure 15:
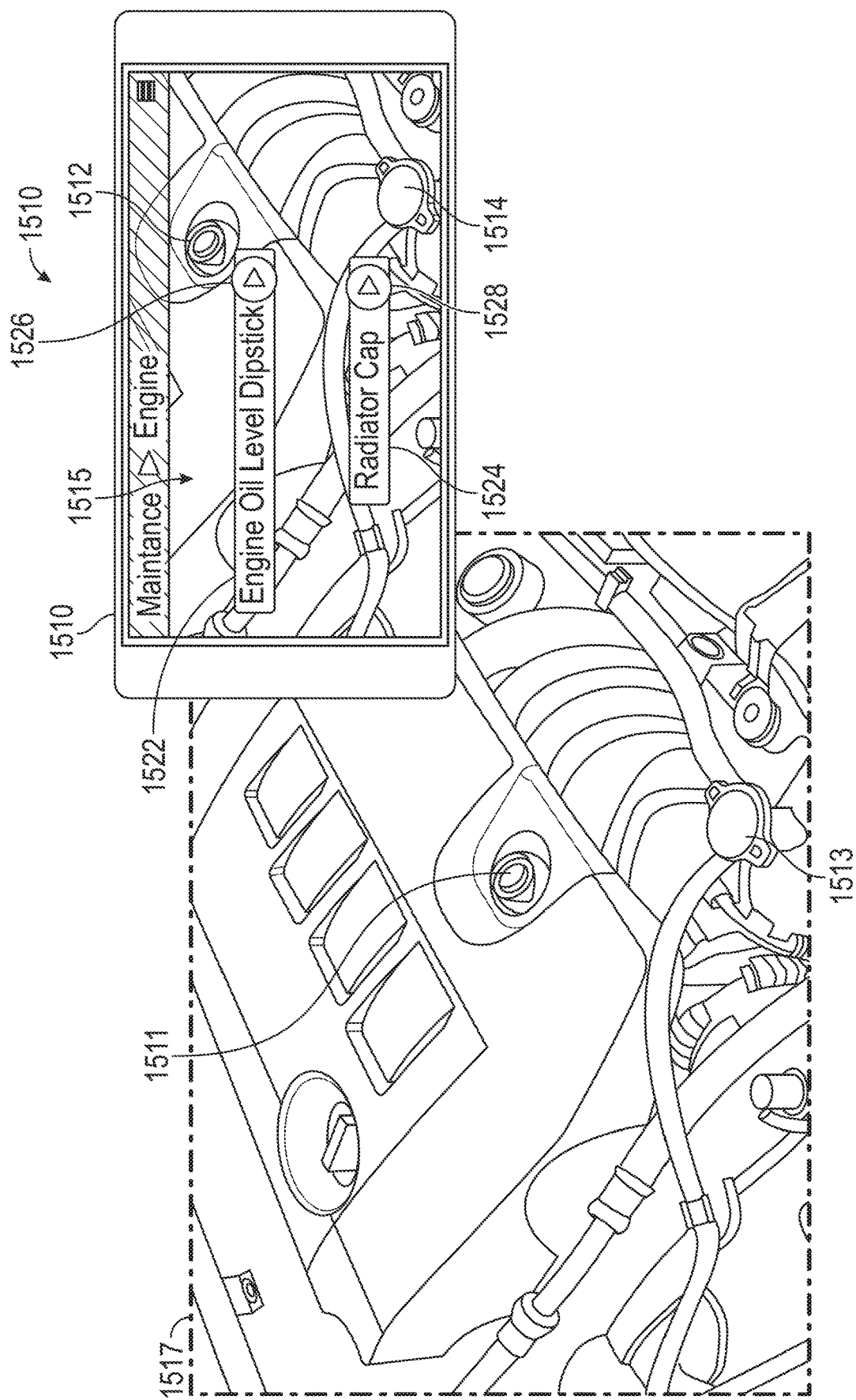

FIG. 15 is a screen shot illustrating an augmented or virtual reality application configured to leverage a phrase map folder as described herein. In the illustrated example, a mobile device 1510 (or any computing device) may comprise software (e.g., an application) executed by the mobile device 1510 and a memory storing the software and a phrase map folder. The mobile device 1510 may display an image 1515 (or one or more frames of a video) of a scene. The image of the scene may be generated using a camera included in the mobile device 1510 (e.g., for augmented reality applications as shown in FIG. 15) or generated from data stored in memory (e.g., for virtual reality applications). In the illustrated example, the image 1515 of a car engine 1517 having features 1511 and 1513 is captured by a camera of the mobile device 1510. The software in the mobile device 1510 is programmed to identify features 1511 and 1513 as items 1512 and 1514, respectively. The identified items 1512 and 1514 may operate as inputs that correspond to phrases used to locate phrase files in the phrase map folder for providing information relevant to each feature 1511, 1513. The phrase file corresponding to the phrases can be executed and the associated micro content graphically displayed as overlays 1522, 1524 adjacent to the corresponding items 1512, 1514. In the illustrated embodiment, the overlays 1522, 1524 graphically display text identifying the items 1512, 1514 and provide a link 1526, 1528 to a video or additional information regarding maintenance for each item 1512 and 1514. In some embodiments, the executed micro content may include the video in the overlays 1522, 1524.

While the foregoing example applications illustrated in FIGS. 11-15 are described as implemented using the phrase map folder, it will be appreciated that these applications may also be implemented using one or more phrase maps (e.g., phrase map data file 405 and/or 406 or phrase map data included as part of document 103). That is, for example, the phrase map data included in the phrase map data file 405 and/or document 103 may be utilized by search engines, database search tools, artificial intelligence and machine learning applications, and other analysis methods to leverage utilization of a phrase to retrieve targeted, relevant information, such as but not limited to, search result applications, frequently asked question (FAQ) databases, chatbot applications, machine learning applications, virtual reality and/or augmented reality instruction applications, field-level help applications, etc. For example, with reference to FIG. 12, a user may input message 1220 that includes term 1225. The chatbot 1210 receives the message, ingests the term 1225, accesses the phrase map data file 405 and identifies a phrase in the phrase map data file 405 that is at least similar to the term 1225. The chatbot 1210 may then execute the executable code text therein, and graphically display the micro corresponding to the identified phrase as response 1226. Accordingly, it will be understood that the phrase map data included in one or more phrase map data files and/or a document may be utilized in a similar manner for utilization in other example applications.

It will be appreciated that phrases need not be true language phrases. That is, while FIGS. 11 and 12 illustrate using phrases "apply condition" or "snippet," the embodiments herein may use any phrase desired. For example, a given graphically displayed element may have a unique identifier or metadata that may be programmed as a phrase for displaying corresponding micro content. The image 1515, for example, may comprise metadata identifying the elements 1512, 1514, which may be implemented as phrases. Similarly, icon 1320 of the electronic form 1310 may have a file name of the image representing the icon (e.g., "?icon_193.jpeg") and the file name may be stored as the phrase associated with the micro content. Thus, in response to interacting with the icon 1320, the file name may be ingested and used to display the response.

Figure 16A:
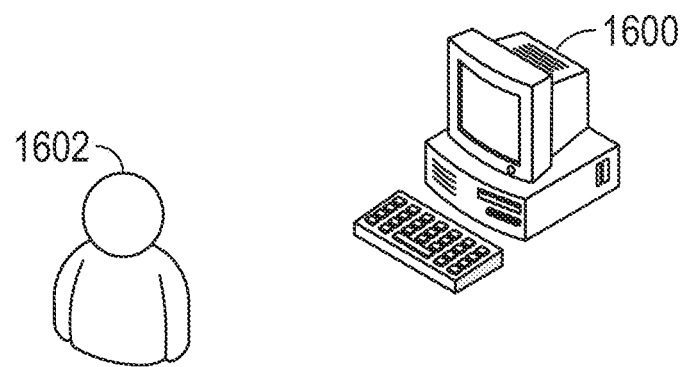
FIG. 16A shows a representation of a computer system and a user.

Various embodiments are realized in electronic hardware, computer software, or combinations of these technologies. FIG. 16A shows one representation of a computer system 1600 and a user 1602. The computer system 1600 is configured to be suitable for practicing the embodiments described herein by providing one or more data processing units or processors 1615 that execute software stored in memory 1620 that allows the user 1602 to create, edit, and maintain document content in the project environment while providing access to document structure and control information. In one example, the computer system 1600 provides one or more processors 1615 that include the micro content editor pane alone and/or paired with the WYSIWYG editor pane to allow creating and managing phrase and response associations and for structure editing within a single interface.

Figure 16B:
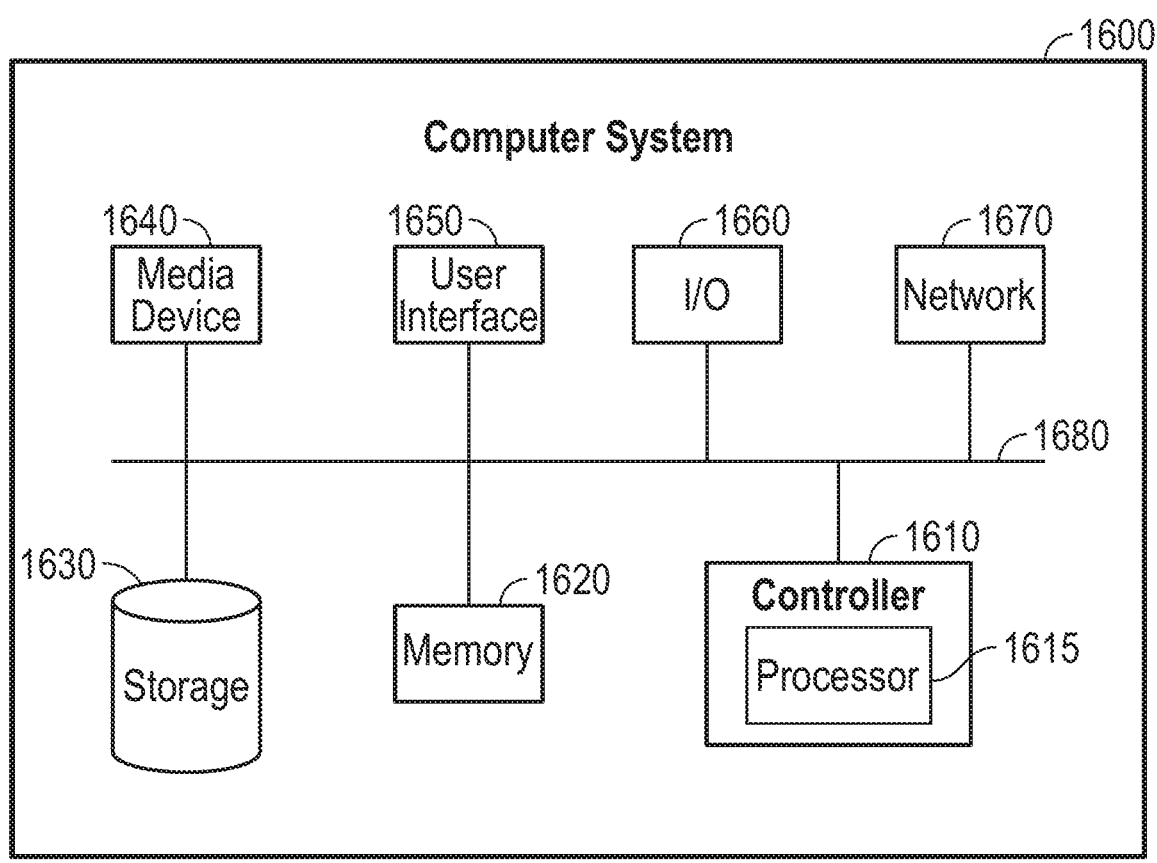
FIG. 16B shows a block diagram of one embodiment of the computer system in FIG. 16A, including an integrated document editor.

FIG. 16B shows a block diagram of one embodiment of the computer system 1600 in FIG. 16A, including the one or more processors 1615. The computer system 1600 includes a controller 1610, a memory 1620, storage 1630, a media device 1640, a user interface 1650, an input/output (I/O) interface 1660, and a network interface 1670. These components are interconnected by a common bus 1680. Alternatively, different connection configurations can be used, such as a star pattern with the controller at the center.

The controller 1610 is a programmable processor and controls the operation of the computer system 1600 and its components. The controller 1610 loads instructions from the memory 1620 or an embedded controller memory (not shown) and executes these instructions to control the system. In its execution, the controller 1610 provides an integrated document editor as a software system. Alternatively, this service can be implemented as separate components in the controller 1610 or the computer system 1600. The one or more processors 1615 include the micro content editor pane implemented to create and manage phrase and response associations. The one or more processors 1615 may also include the micro content editor pane paired with the WYSIWYG editor pane comprising the VDSI pane to allow for both structure editing and managing phrase and response associations within a single interface.

Memory 1620 stores data temporarily for use by the other components of the computer system 1600, such as for storing document and structure (e.g., control data) information. In some embodiments, the memory 1620 may store instructions for processing documents and/or the hierarchical project as described herein in connection to FIGS. 1-15. For example, the instructions (sometimes referred to a software programmed into the memory that can be executed by the controller 1610) may include designating micro content and crating phrases as described in connection with FIGS. 1 and 3-9C and compiling documents and/or hierarchical project data as described in connection with FIGS. 11-15. In one embodiment, memory 1620 is implemented as RAM. In one embodiment, memory 1620 also includes long-term or permanent memory, such as flash memory and/or ROM.

Storage 1630 stores data temporarily or long term for use by the other components of the computer system 1600. In one embodiment, storage 1630 is a hard disk drive. Storage 1630 stores information for use by one or more processors 1615, such as content data (e.g., content data files) or structure document information (e.g., control data files), including phrases, micro content, and associations therebetween. Storage 1630 also stores data generated by one or more processors 1615.

The media device 1640 receives removable media and reads and/or writes data to the inserted media. In one embodiment, the media device 1640 is an optical disc drive.

The user interface 1650 includes components for accepting user input from a user of the computer system 1600 and presenting information to the user. In one embodiment, the user interface 1650 includes a keyboard, a mouse, audio speakers, and a display. The controller 1610 uses input from the user to adjust the operation of the computer system 1600.

The I/O interface 1660 includes one or more I/O ports to connect to corresponding I/O devices, such as external storage or supplemental devices (e.g., a printer or a PDA). In one embodiment, the ports of the I/O interface 1660 include ports such as: USB ports, PCMCIA ports, serial ports, and/or parallel ports. In another embodiment, the I/O interface 1660 includes a wireless interface for communication with external devices wirelessly.

The network interface 1670 includes a wired and/or wireless network connection, such as an RJ-45 or "Wi-Fi" interface (802.11) supporting an Ethernet connection.

The computer system 1600 includes additional hardware and software typical of computer systems (e.g., power, cooling, operating system), though these components are not specifically shown in FIG. 16B for simplicity. In other embodiments, different configurations of the computer system can be used (e.g., different bus or storage configurations or a multi-processor configuration).

The steps of a method or algorithm or the functions of a module, unit or block described in connection with the embodiments disclosed herein can be embodied directly in hardware, in a software module executed by a processor, or in a combination of the two. Furthermore, those of skill in the art will appreciate that the various illustrative logical blocks, modules, units, and method steps described in connection with the above described figures and the embodiments disclosed herein can often be implemented as electronic hardware, computer software, or combinations of both. To clearly illustrate this interchangeability of hardware and software, various illustrative components, blocks, modules, units, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, unit or step is for ease of description. Specific functions or steps can be moved from one module, block or unit to another without departing from the invention.

While various embodiments have been described above, it should be understood that they have been presented by way of example only, and not of limitation. The breadth and scope should not be limited by any of the above-described example embodiments. Where this document refers to technologies that would be apparent or known to one of ordinary skill in the art, such technologies encompass those apparent or known to the skilled artisan now or at any time in the future. In addition, the described embodiments are not restricted to the illustrated example architectures or configurations, but the desired features can be implemented using a variety of alternative architectures and configurations. As will become apparent to one of ordinary skill in the art after reading this document, the illustrated embodiments and their various alternatives can be implemented without confinement to the illustrated example. One of ordinary skill in the art would also understand how alternative functional, logical or physical partitioning and configurations could be utilized to implement the desired features of the described embodiments.

Furthermore, although items, elements or components can be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases can be absent.

Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C.

The foregoing method descriptions and the process flow diagrams are provided merely as illustrative examples and are not intended to require or imply that the operations of the various embodiments must be performed in the order presented. As will be appreciated by one of skill in the art the order of operations in the foregoing embodiments may be performed in any order. Words such as "thereafter," "then," "next," etc., are not intended to limit the order of the operations; these words are simply used to guide the reader through the description of the methods. Further, any reference to claim elements in the singular, for example, using the articles "a," "an," or "the" is not to be construed as limiting the element to the singular.

Various illustrative embodiments have been described. However, one of ordinary skill in the art will see that additional embodiments are also possible and within the scope of those embodiments. Accordingly, the present invention is not limited to only those embodiments described above.

What is claimed is:

1. A system for processing a document, the system comprising:
   at least one memory
      storing the document as a data file comprising content data, and
      storing instructions for processing the document; and
   at least one processor coupled to the at least one memory and configured to execute the instructions to:
   generate a graphical user interface (GUI),
   designate a plurality of portions of the content data as a plurality of micro content elements in response to user input via the GUI,
      receive, via the GUI, user input providing a plurality of phrases to locate and identify respective micro content elements of the plurality of micro content elements,
      generate a phrase map configured to associate individual phrases of the plurality of phrases with respective individual micro content elements of the plurality of micro content elements and store the phrase map as phrase map data in the at least one memory, the phrase map data comprising
         at least the plurality of phrases and
         a plurality of references indicative of the plurality of micro content elements and referenceable to display the individual micro content elements associated with the respective individual phrases,
         the plurality of phrases being associated with the plurality of references, and
         the phrase map data being in a computer format,
      compile the phrase map data in part by traversing the data file to generate a phrase map folder comprising at least the plurality of phrases and the plurality of micro content elements,
      receive a term,
      access the phrase map folder and identify a phrase of the plurality of phrases that corresponds to the term, and
      display a micro content element of the plurality of micro content elements associated with the identified phrase of the plurality of phrases based on a reference of the plurality of references;
   wherein the instructions to
      access the phrase map folder and identify a phrase of the plurality of phrases that is at least similar to the term, and
      display the micro content element of the plurality of micro content elements associated with the identified phrase of the plurality of phrases,
   are executed by a chatbot.

2. The system of claim 1, wherein the plurality of portions of the content data comprises non-textual content.

3. The system of claim 1, wherein a reference indicative of an associated micro content element is at least one of a link to the associated micro content element and the associated micro content element provided in an executable code format.

4. The system of claim 1, wherein the at least one processor is further configured to generate and display a graphical user interface comprising one or more display panes and operating to display the data file in a first display pane and receive user inputs.

5. The system of claim 4, wherein the at least one processor is configured to display content of the document in the first display pane based on executing the content data stored in the at least one memory, and the plurality of micro content elements being a portion of the displayed content selected according to user input in the first display pane, wherein the at least one processor is further configured to update the data file based on the selected portion of the displayed content.

6. The system of claim 5, wherein the data file is updated to include a first tag and a second tag having a portion of the content data corresponding to the selected portion of the displayed content therebetween.

7. The system of claim 5, wherein the first display pane comprises a visual document structure indicator pane representative of underlying structure of the displayed content based in part on control data included in the data file, wherein the visual document structure indicator pane is updated to include an element indicative of the designated micro content.

8. The system of claim 5, wherein the at least one processor is configured to execute the instructions to:
   display content of individual micro content elements of the plurality of micro content elements in a What You See Is What You Get editor pane for processing content of the individual micro content elements of the plurality of micro content elements in a center area of a second display pane;
   display underlying structure of the individual micro content elements of the plurality of micro content elements in a visual document structure indicator pane for processing the underlying structure of the individual micro content elements of the plurality of micro content elements in a second area of the second display pane; and
   display the individual phrases of the plurality of phrases in a format for processing the phrase map in a third display pane coupled to the second display pane.

9. The system of claim 8, wherein the at least one processor is configured to execute the instructions to update the reference indicative of the associated micro content element in the phrase map data with executable code format based on the processed content or processed underlying structure of the micro content element.

10. The system of claim 1, wherein each reference of the plurality of references is associated with one or more phrases of the plurality of phrases.

11. The system of claim 1, wherein the phrase map folder comprises a unique extension for a first phrase of the plurality of phrases and a first micro content element of the plurality of micro content elements provided in an executable code format, wherein the first micro content element is associated with the first phrase.

12. The system of claim 1, wherein compiling the phrase map data in part by traversing the data file generates a published output file corresponding to the phrase map folder.

13. The system of claim 1, wherein each reference of the plurality of references is associated with one or more phrases of the plurality of phrases.

14. The system of claim 1, wherein the chatbot is a search engine.

15. A method for processing a document, the method comprising:
    storing the document as a data file comprising content data;
    generate a graphical user interface (GUI);
    designating at least a portion of the content data as a plurality of micro content elements in response to user input via the GUI;
    receiving user input, via the GUI, providing a plurality of phrases to locate and identify respective micro content elements of the plurality of micro content elements;
    generating a phrase map which associates individual phrases of the plurality of phrases with respective individual micro content elements of the plurality of micro content elements and storing the phrase map as phrase map data in at least one memory, the phrase map data comprising
        the plurality of phrases and
        a plurality of references indicative of the plurality of micro content elements and referenceable to display the individual micro content elements of the plurality of micro content elements associated with respective individual phrases in a computer format;
    generating a phrase map folder from the phrase map data, the phrase map folder comprising at least the plurality of phrases and the plurality of micro content elements;
    receiving a term;
    accessing the phrase map folder and identifying a phrase of the plurality of phrases that corresponds to the term; and
    displaying a micro content element of the plurality of micro content elements associated with the identified phrase of the plurality of phrases based on a reference of the plurality of references;
    wherein the steps of
        accessing the phrase map folder and identifying a phrase of the plurality of phrases that corresponds to the term; and
        displaying the micro content element of the plurality of micro content elements associated with the identified phrase of the plurality of phrases
    are executed by a chatbot.

16. The method of claim 15, wherein the at least a portion of the content data comprises non-textual content.

17. The method of claim 15, wherein the plurality of references are at least one of a link to the micro content element and the micro content element provided in an executable code format.

18. The method of claim 15, further comprising generating and displaying a graphical user interface comprising one or more display panes and operating to display the data file in a first display pane and receive user inputs.

19. The method of claim 18, further comprising displaying content of the document in the first display pane based on executing the content data stored in the at least one memory, and one of the plurality of micro content elements being a portion of the displayed content selected according to user input in the first display pane, wherein the at least one processor is further configured to update the data file based on the selected portion of the displayed content.

20. The method of claim 19, further comprising updating the data file to include a first tag and a second tag having a portion of the data file corresponding to the selected portion of the displayed content therebetween.

21. The method of claim 19, further comprising displaying a visual document structure indicator pane representative of underlying structure of the displayed content based in part on control data included in the data file, and updating the visual document structure indicator pane to include an element indicative of the one of the plurality of micro content elements.

22. The method of claim 21, further comprising:
    displaying content of the one of the plurality of micro content elements in a What You See Is What You Get editor pane for processing content of the one of the plurality of micro content elements in a center area of a second display pane;
    displaying underlying structure of the one of the plurality of micro content elements in a visual document structure indicator pane for processing the underlying structure of the one of the plurality of micro content elements in a second area of the second display pane.

23. The method of claim 22, further comprising updating the reference indicative of the associated micro content element in the phrase map data with executable code format based on the processed content or processed underlying structure of the micro content.

24. The method of claim 15, wherein the phrase map comprises a plurality of references indicative of a plurality of micro content elements, each reference associated with one or more phrases of a plurality of phrases.

25. The method of claim 15, wherein the phrase map folder comprises a unique extension for each of the plurality of phrases and the respective micro content elements of the plurality of micro content elements associated therewith provided in an executable code format.

26. The method of claim 15, wherein generating the phrase map folder from the phrase map data further comprises generating a published output file corresponding to the phrase map folder.

27. The method of claim 15, wherein the phrase map comprises a plurality of references indicative of the plurality of micro content elements, each reference associated with one or more phrases of the plurality of phrases.

28. The method of claim 15, wherein the phrase map data is included in a phrase map data file or in the data file of the document.

29. An apparatus, comprising:
    a means for storing the document as a data file comprising content data;
    a means for designating at least a portion of the content data as a plurality of micro content elements via a graphical user interface (GUI);
    a means for receiving, via the GUI, user input providing a plurality of phrases to locate and identify a respective micro content elements of the plurality of micro content elements;
    a means for generating a phrase map which associates individual phrases of the plurality of phrases with respective individual the micro content elements and storing the phrase map as phrase map data in the storing means, the phrase map data comprising at least
        the plurality of phrases and
        a plurality of references indicative of the plurality of micro content elements and referenceable to display the individual micro content elements of the plurality of micro content elements associated with respective individual phrases in a computer format;

a means for generating a phrase map folder from the phrase map data, the phrase map folder comprising at least the plurality of phrases and the plurality of micro content elements; and a means for receiving a term, accessing the phrase map folder and identifying a phrase of the plurality of phrases that corresponds to the term, and displaying a micro content element of the plurality of micro content elements associated with the identified phrase of the plurality of phrases based on a reference of the plurality of references;

wherein the means for receiving a term, accessing the phrase map folder and identifying a phrase of the plurality of phrases that corresponds to the term, and displaying the micro content element of the plurality of micro content elements associated with the identified phrase of the plurality of phrases comprises at least one processor executing a chatbot program.

30. The system of claim 13, wherein the phrase map folder comprises a plurality of phrase files each corresponding to a phrase of the plurality of phrases, each phrase file comprising:

a filename based on the phrase of the plurality of phrases, and a body comprising the phrase of the plurality of phrases and the at least a portion of the micro content element of the plurality of micro content elements associated with the phrase of the plurality of phrases.

* * * * *